United States Patent
Suzuki et al.

(10) Patent No.: US 11,040,596 B2
(45) Date of Patent: Jun. 22, 2021

(54) VEHICLE CONTROL DEVICE AND DELIVERY SYSTEM

(71) Applicant: HONDA MOTOR CO., LTD., Tokyo (JP)

(72) Inventors: Atsuyuki Suzuki, Wako (JP); Naoko Imai, Wako (JP); Tomoko Shintani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 16/282,497

(22) Filed: Feb. 22, 2019

(65) Prior Publication Data
US 2019/0283536 A1    Sep. 19, 2019

(30) Foreign Application Priority Data
Mar. 16, 2018    (JP) .............................. JP2018-049835

(51) Int. Cl.
| B60H 1/00 | (2006.01) |
| G06Q 10/08 | (2012.01) |
| B60J 3/02 | (2006.01) |
| B60H 1/32 | (2006.01) |

(52) U.S. Cl.
CPC ..... B60H 1/00878 (2013.01); B60H 1/00428 (2013.01); B60H 1/3232 (2013.01); B60J 3/02 (2013.01); G06Q 10/0836 (2013.01)

(58) Field of Classification Search
CPC ... B60J 3/002; B60J 3/005; B60J 3/02; B60H 1/00878; G06Q 10/0836
See application file for complete search history.

(56) References Cited

U.S. PATENT DOCUMENTS

| 9,682,609 | B1 * | 6/2017 | Dudar | B60H 1/00785 |
| 2005/0225175 | A1 * | 10/2005 | Maehara | B60W 10/06 307/10.1 |
| 2015/0051763 | A1 * | 2/2015 | Enomoto | B60L 11/1862 701/22 |
| 2019/0248241 | A1 * | 8/2019 | Badger, II | B60L 58/27 |
| 2019/0311327 | A1 * | 10/2019 | Habbaba | H04W 4/44 |

FOREIGN PATENT DOCUMENTS

| CN | 204990038 U | 1/2016 |
| CN | 105751941 A | 7/2016 |
| JP | 2006-206225 A | 8/2006 |

OTHER PUBLICATIONS

Chinese Office Action dated Apr. 1, 2021, 8 pages.

* cited by examiner

*Primary Examiner* — Peter D Nolan
*Assistant Examiner* — Tanya C Sienko
(74) *Attorney, Agent, or Firm* — Rankin, Hill & Clark LLP

(57) ABSTRACT

A vehicle control device includes an article storage condition acquiring section that acquires a storage condition of an article that is accommodated in a room of a vehicle, and an indoor environment control section that controls an indoor environment of the vehicle by operating an air-conditioning device of the vehicle, and sunshades, based on the storage condition acquired in the article storage condition acquiring section.

6 Claims, 16 Drawing Sheets

FIG.2
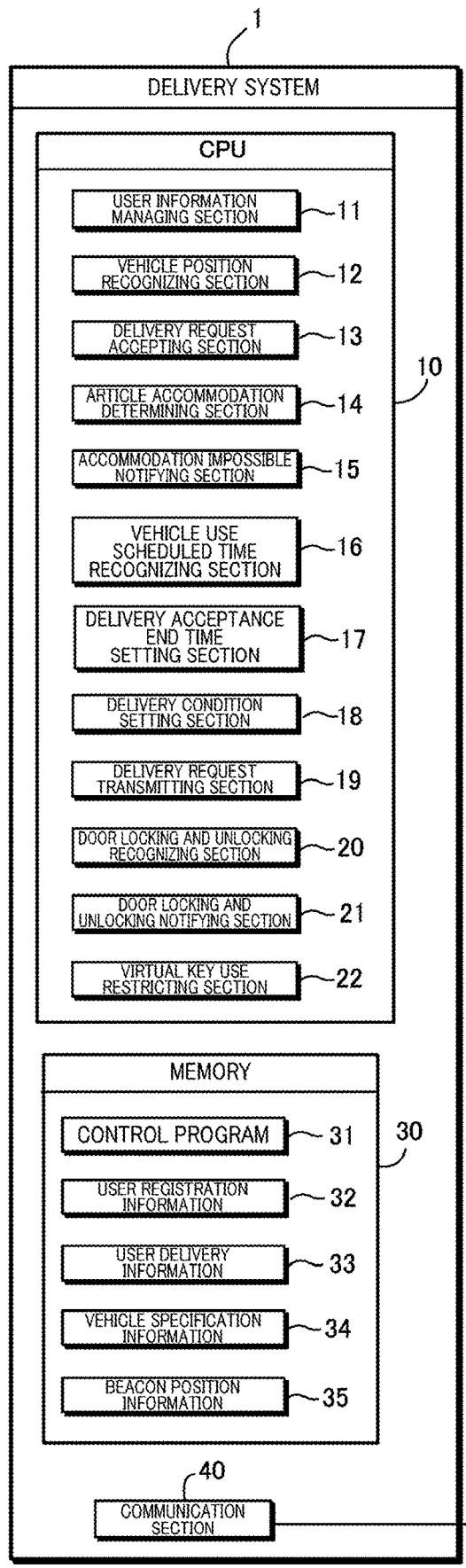
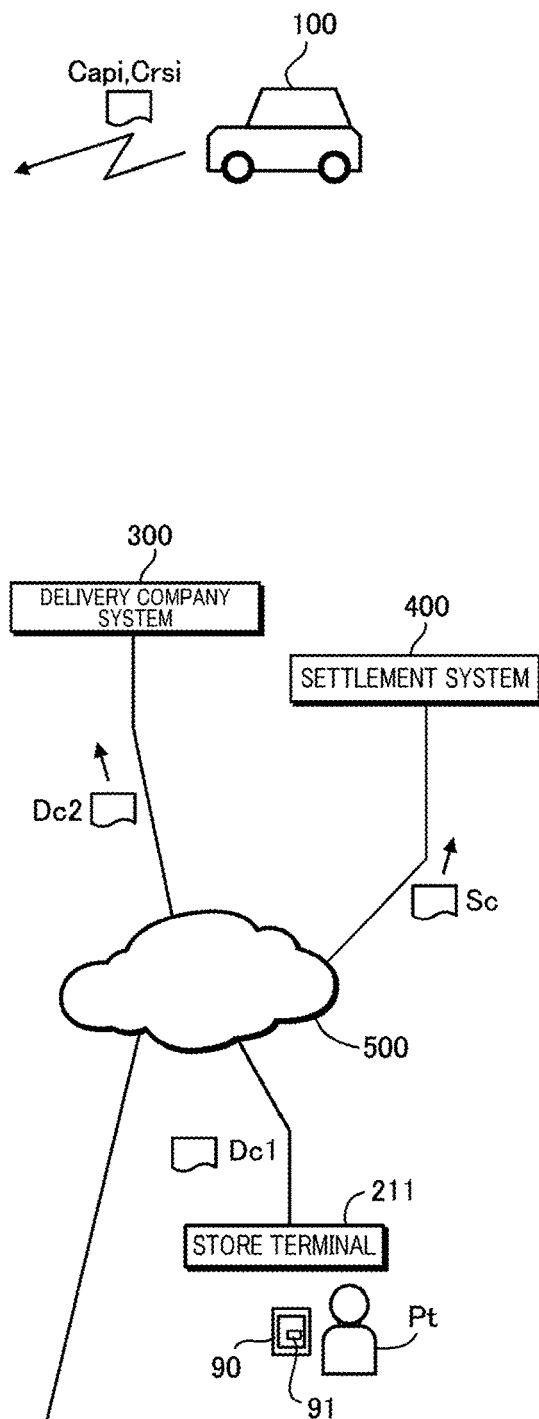

FIG.13

| 33a | 33b | 33c | 33d | 33e | 33f | 33g | 33h | 33i |
|---|---|---|---|---|---|---|---|---|
| USER ID | QR CODE | EXTENDED VEHICLE INFORMATION | PARKING POSITION INFORMATION | SCHEDULED TIME OF DEPARTURE | ACCEPTING STORE INFORMATION | DELIVERED ARTICLE INFORMATION | STORAGE CONDITION | ACCOMMODATION METHOD |
| Pt-001 | QR-001 | ExCARIF-A | FIRST PARKING LOT AREA A | [18:00 DELIVERY ACCEPTANCE ~ 17:00] | STORE 1<br>STORE 2<br>STORE 3<br>STORE 4 | Pd11<br>Pd12<br>Pd13<br>Pd14 | AVOID SUNLIGHT<br>25°C OR LESS<br>ROOM TEMPERATURE<br>ROOM TEMPERATURE | CARRIAGE ROOM<br>REAR SEAT<br>CARRIAGE ROOM<br>CARRIAGE ROOM |
| Pt-002 | QR-002 | ExCARIF-B | SECOND PARKING LOT SECOND FLOOR AREA G | [18:00 DELIVERY ACCEPTANCE ~ 16:30] | STORE 2<br>STORE 3<br>STORE 5 | Pd21<br>Pd22<br>Pd23 | ROOM TEMPERATURE<br>ROOM TEMPERATURE<br>ROOM TEMPERATURE | ARRANGEMENT C, ACCOMMODATE UPRIGHT<br>CARRIAGE ROOM<br>CARRIAGE ROOM |
| Pt-003 | QR-003 | ExCARIF-C | FIRST PARKING LOT AREA A | [18:00 DELIVERY ACCEPTANCE ~ 16:00] | STORE 2<br>STORE 3<br>STORE 5 | Pd21<br>Pd22<br>Pd23 | ROOM TEMPERATURE<br>25°C OR LESS<br>CARRIAGE ROOM | ARRANGEMENT A<br>REAR SEAT<br>CARRIAGE ROOM |
| Pt-004 | QR-004 | ExCARIF-D | SECOND PARKING LOT THIRD FLOOR AREA B | [18:00 DELIVERY ACCEPTANCE ~ 16:30] | STORE 2<br>STORE 3<br>STORE 5 | Pd21<br>Pd22<br>Pd23 | ROOM TEMPERATURE<br>25°C OR LESS<br>ROOM TEMPERATURE | ARRANGEMENT B<br>REAR SEAT<br>CARRIAGE ROOM |
| Pt-005 | QR-005 | ExCARIF-E | SECOND PARKING LOT THIRD FLOOR AREA H | [18:00 DELIVERY ACCEPTANCE ~ 17:30] | STORE 2<br>STORE 3<br>STORE 5 | Pd21<br>Pd22<br>Pd23 | ROOM TEMPERATURE<br>20°C OR LESS<br>ROOM TEMPERATURE | ARRANGEMENT A<br>REAR SEAT<br>CARRIAGE ROOM |
| .. | | | | | | | | |

VEHICLE CONTROL DEVICE AND DELIVERY SYSTEM

INCORPORATION BY REFERENCE

The present application claims priority under 35 U.S.C. § 119 to Japanese Patent Application No. 2018-049835 filed on Mar. 16, 2018. The content of the application is incorporated herein by reference in its entirety.

BACKGROUND OF THE INVENTION

Field of the Invention

The present invention relates to a vehicle control device and a delivery system.

Description of the Related Art

There has been conventionally proposed a delivery system that delivers an article to be delivered to a receiving vehicle to enable transfer of the article to be delivered even when a receiver is absent (refer to Japanese Patent Laid-Open No. 2006-206225, for example). In the delivery system described in Japanese Patent Laid-Open No. 2006-206225, authentication information for unlocking a trunk of the receiving vehicle is registered in a delivery information server in advance.

A delivery person unlocks the trunk of the receiving vehicle by communicating with the receiving vehicle by a communication instrument provided in a delivery vehicle, and performing authentication based on the authentication information. Subsequently, the delivery person accommodates the article to be delivered in the trunk of the receiving vehicle and locks the trunk.

SUMMARY OF THE INVENTION

As described above, when an article is accommodated in the room of a vehicle such as a trunk of the vehicle, the environment in the room is brought into a situation that is unsuitable for storing the article depending on the kind of the article or an external environment, and quality of the article is likely to be reduced.

The present invention is made in the light of the above described background, and has an object to provide a vehicle control device capable of suppressing deterioration of quality of an article accommodated in a room of a vehicle, and a delivery system.

A vehicle control device of an aspect of the present invention includes an article storage condition acquiring section that acquires a storage condition of an article that is accommodated in a room of a vehicle, and an indoor environment control section that controls an indoor environment of the vehicle by operating an on-vehicle device of the vehicle, based on the storage condition acquired in the article storage condition acquiring section.

According to the aspect of the present invention like this, the indoor environment of the vehicle can be made consistent with the storage condition of the article by operating the on-vehicle device based on the storage condition acquired by the article storage condition acquiring section. Thereby, quality of the article accommodated in the room of the vehicle can be prevented from being deteriorated.

Further, a configuration may be adopted, in which the on-vehicle device includes an air-conditioning device that controls air-conditioning in the room of the vehicle, and when a storage temperature of the article is included in the storage condition acquired in the article storage condition acquiring section, the indoor environment control section operates the air-conditioning device based on the storage temperature.

According to the configuration, by operating the air-conditioning device, and controlling the inside of the room of the vehicle at the storage temperature of the article, the quality of the article which is accommodated in the room of the vehicle can be prevented from being deteriorated.

Further, a configuration may be adopted, in which the on-vehicle device includes a sunshade that is provided at a window or door of the vehicle and is for shielding sunlight into the room of the vehicle, and when the storage condition acquired in the article storage condition acquiring section includes avoidance of sunlight, the indoor environment control section operates the sunshade. A configuration may be adopted, in which the storage condition includes avoidance of sunlight, the on-vehicle device includes the sunshade provided at the window or the door of the vehicle, and the indoor environment control section operates the sunshade so that sunlight into the room of the vehicle from the window is shielded.

According to the configuration, by avoiding sunlight hitting the article by operating the sunshade, the quality of the article accommodated in the room of the vehicle can be prevented from being deteriorated.

Further, a configuration may be adopted, in which the article storage condition acquiring section acquires a storage condition of the article with delivery to the vehicle being scheduled, and the indoor environment control section operates the on-vehicle device of the vehicle based on the storage condition, when the article is accommodated in the vehicle by the delivery.

According to the configuration, the quality of the article accommodated in the room of the vehicle can be prevented from being deteriorated by delivery.

Further, a configuration may be adopted, which includes an accommodation method reporting section that reports accommodation of the article to a spot where sunlight into the room of the vehicle is shielded, or setting of the sunshade for shielding sunlight into the room of the vehicle to a terminal device of a delivery person who performs the delivery, when avoidance of sunlight is included in the storage condition acquired in the article storage condition acquiring section.

According to the configuration, by reporting the accommodation method suitable for the article to the delivery person, accommodation of the article in a suitable spot in the room of the vehicle is promoted, and the quality of the article can be prevented from being deteriorated during accommodation.

Further, a configuration may be adopted, in which a remaining energy amount detecting section that detects a remaining energy amount of a power source that supplies electric power to the on-vehicle device is included, and the indoor environment control section does not operate the on-vehicle device when the remaining energy amount detected by the remaining energy amount detecting section is a predetermined lower limit amount or less.

According to the configuration, the situation can be prevented, in which the remaining energy amount of the power source further decreases from a lower limit amount by operation of the on-vehicle device, and travelling of the vehicle is hindered.

Further, a configuration may be adopted, in which an energy supply detecting section that detects that energy is supplied to the power source from an energy replenishment device is included, and the indoor environment control section operates the on-vehicle device even when the remaining energy amount of the power source is the lower limit amount or less, when it is detected that energy is supplied to the power source from the energy replenishment device by the energy supply detecting section.

According to the configuration, the situation is such that energy is supplied to the power source from the energy replenishment device, so that even when the remaining energy amount of the power source temporarily becomes the lower limit amount or less, the remaining energy amount can be restored by supply from the energy replenishment device. Therefore, the on-vehicle device can be operated while the remaining energy amount of the power source is kept.

Next, a delivery system of an aspect of the present invention is a delivery system that supports delivery of an article to a vehicle including a vehicle control device having an article storage condition acquiring section, an indoor environment control section, and a remaining energy amount detecting section. The article storage condition acquiring section that acquires a storage condition of an article that is accommodated in a room of a vehicle. The indoor environment control section controls an indoor environment of the vehicle by operating an on-vehicle device of the vehicle based on the storage condition acquired in the article storage condition acquiring section. The remaining energy amount detecting section detects a remaining energy amount of a power source that supplies electric power to the on-vehicle device. The delivery system includes a delivery request accepting section, a time information acquiring section, and a storage impossible notifying section. The delivery request accepting section accepts delivery of the article to the vehicle. The time information acquiring section acquires a scheduled time of delivery of the article to the vehicle and a scheduled time of start of use of the vehicle. The storage impossible notifying section determines whether it is possible or impossible to operate the on-vehicle device based on the storage condition while keeping a state in which a remaining energy amount of the power source detected by the remaining energy amount detecting section is larger than a predetermined lower limit energy amount, in a period from the scheduled time of delivery until the scheduled time of start of use, when a delivery request of the article to the vehicle is accepted by the delivery request accepting section. The storage impossible notifying section notifies an acceptance terminal device that accepts the delivery request, or a terminal device of a delivery requester who makes the delivery request that storage of the article in the vehicle is impossible, when determining that it is impossible.

According to the aspect of the present invention like this, the acceptance terminal device or the delivery request terminal are notified that storage in the vehicle is impossible, when it is assumed to be impossible to operate the on-vehicle device based on the storage condition of the article while keeping the state in which the energy remaining amount of the power source is larger than the lower limit amount until the scheduled time of start of use of the vehicle even when the article is delivered to the vehicle at the scheduled time of delivery. By urging the delivery requester to stop delivery to the vehicle by the notice, the quality of the article stored in the room of the vehicle by delivery can be prevented from being deteriorated by stop of operation of the on-vehicle device.

BRIEF DESCRIPTION OF THE DRAWINGS

FIG. 2 is a configuration diagram of the delivery system;

FIG. 13 is an explanatory diagram of user delivery information;

DETAILED DESCRIPTION OF THE PREFERRED EMBODIMENTS

1. Delivery Form Using Delivery System

Figure 1:
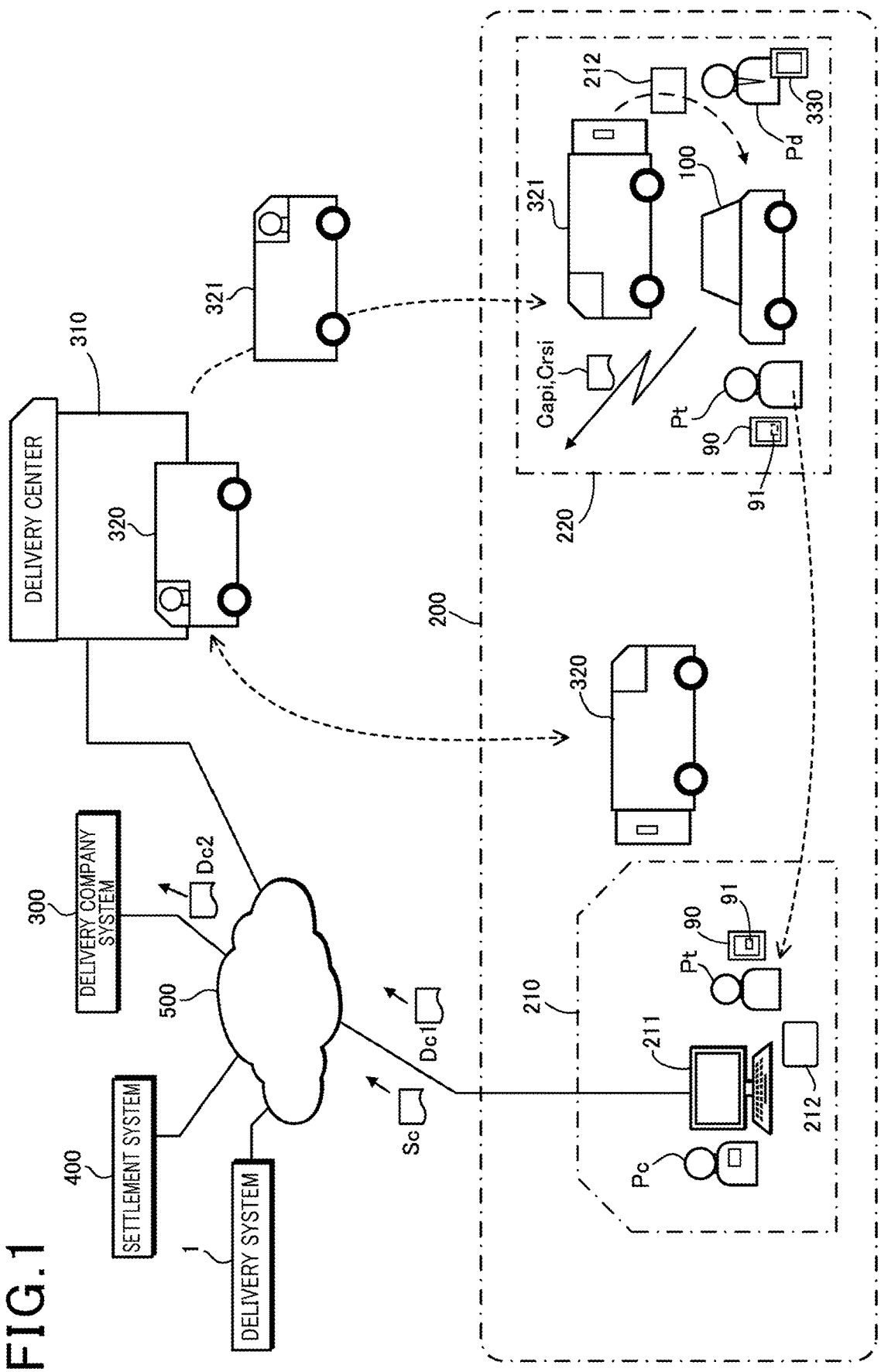
FIG. 1 is an explanatory view illustrating a delivery form of an article to a vehicle using a delivery system.

FIG. 1 illustrates a delivery of an article to a vehicle using a delivery system in a present embodiment. With reference to FIG. 1, a delivery system 1 of the present embodiment performs a process of supporting delivery of an article 212 to a vehicle 100 in a predetermined area 200 such as a shopping mall, a commercial area, and a sightseeing area. Hereinafter, a case where the predetermined area 200 in FIG. 1 is a theme park in a holiday resort will be described.

FIG. 1 illustrates a situation in which a user Pt who has finished use registering for a delivery service that is provided by the delivery system 1 in advance visits a theme park 200 by the vehicle 100, and uses the delivery service. The user Pt stops the vehicle 100 which is driven to the theme park 200, in a parking lot 220, moves in the theme park 200 on foot, and purchases the article 212 in a store 210 in the theme park 200.

The user Pt (delivery requester) requests delivery of the purchased article 212 to the vehicle 100, in the store 210, and in response to the request, the article 212 is picked up to a delivery center 310 by a delivery car 320, and the article 212 is delivered to the vehicle 100 from the delivery center 310 by a delivery car 321.

In a user terminal 90 (communication terminal such as a smartphone and a cellular phone) that is owned by the user Pt, identification information (user identification information) peculiar to the user Pt issued from the delivery system 1 is stored. As the user identification information, a QR code (registered trademark), a barcode, an authentication code for NFC (Near Field Communication) authentication or the like is used, and in the present embodiment, a QR code 91 is used as the user identification information. The delivery system 1 is communicably connected to the user terminal 90, a store terminal 211 of the store 210 (provider of the article), a delivery company system 300, a settlement system 400, and the vehicle 100 via a communication network 500. Further, the delivery company system 300 and the delivery center 310 of the delivery company are communicably connected via the communication network 500. Communication connection among the respective communication elements may be either wired connection or wireless connection.

The delivery system 1 receives vehicle position information Capi and vehicle room situation information Crsi of the vehicle 100, which are transmitted from the vehicle 100. The vehicle position information Capi includes information of the parking position of the vehicle 100, which is detected in the vehicle 100, and the vehicle room situation information Crsi includes information on a number of passengers, a loading situation of carriage and the like, which are detected in the vehicle 100. The delivery system 1 recognizes the parking position of the vehicle 100 based on the vehicle position information Capi and determines whether or not accommodation of the article 212 in the vehicle 100 is possible based on the vehicle room situation information Crsi.

The user Pt causes the user terminal 90 to display the QR code 91 that is issued by the delivery system 1 when the user Pt purchases the article 212 (hereinafter, also referred to as the purchased article 212) in the store 210. A sales clerk Pc in the store 210 reads the QR code 91 by the store terminal 211. The store terminal 211 transmits delivery request information Dc1 including the QR code 91 and information on the article 212 (an article number, a size, a quantity and the like), and information on the store 210 (a store name, a place, a contact address and the like) to the delivery system 1. The store terminal 211 includes a function of an acceptance terminal device of the present invention.

Further, when authentication by NFC is performed, the user Pt brings the user terminal 90 close to the store terminal 211 and transmits the authentication code to the store terminal 211 from the user terminal 90 by communication by NFC. Subsequently, the store terminal 211 transmits the authentication code and the delivery request information Dc1 to the delivery system 1.

The delivery system 1 transmits delivery request information Dc2 obtained by adding information on the parking position of the vehicle 100, information on the virtual key for unlocking a door of the vehicle 100 by an operation of a delivery person terminal 330 and the like to the delivery request information Dc1, to the delivery company system 300.

The delivery company system 300 instructs a pickup job of the article 212 in the store 210 and a delivery job of the article 212 to the vehicle 100 which is parked in the parking lot 220, to the delivery center 310 which is the closest to the theme park, based on the delivery request information Dc2. In accordance with the pickup job, pickup of the article 212 in the store 210 by the delivery car 320 is performed, and the article 212 is temporarily stored in the delivery center 310.

Further, in accordance with the delivery job, delivery of the article 212 to the vehicle 100 from the delivery center 310 by the delivery car 321 is performed. A delivery person Pd unlocks the door of the vehicle 100 by using the virtual key by the delivery person terminal 330 owned by the delivery person Pd. The delivery person Pd moves the article 212 to the vehicle 100 from the delivery car 321, uses the virtual key by the delivery person terminal 330 to lock the door of the vehicle 100, and completes the delivery.

In this way, the user Pt can request delivery to the vehicle 100, without performing complicated procedures of instructing the parking position of the vehicle 100 and the like, by a simple procedure of presenting the QR code 91 in the store 210 where the user Pt purchases the article 212.

Further, the store terminal 211 acquires credit information (credit card information for on-line settlement, electronic money card information and the like) of the user Pt which is managed by the delivery system 1 by being associated with the QR code 91 from the delivery system 1. The store terminal 211 transmits settlement request information Sc including use information of the user Pt, a purchase price of the article 212 and the like to the settlement system 400. The settlement system 400 performs a settlement process of payment of the price of the article 212 based on the settlement request information Sc.

In this case, the user Pt does not have to perform procedures of additionally presenting a credit card to the sales clerk Pc and the like for a purchase procedure of the article 212, and the purchase procedure of the article 212 and the delivery request to the vehicle 100 can be efficiently performed at one time.

2. Configuration of Delivery System

Next, FIG. 2 is a configuration diagram of the delivery system 1. With reference to FIG. 2, the delivery system 1 is a computer system configured by a CPU (Central Processing Unit) 10, a memory 30, a communication section 40, various interface circuits (not illustrated) and the like. The CPU 10 functions as a user information managing section 11, a vehicle position recognizing section 12, a delivery request accepting section 13, an article accommodation determining section 14, an accommodation impossible notifying section 15, a vehicle use scheduled time recognizing section 16, a delivery acceptance end time setting section 17, a delivery condition setting section 18, a delivery request transmitting section 19, a door locking and unlocking recognizing section 20, a door locking and unlocking notifying section 21, and a virtual key use restricting section 22.

In the memory 30, user registration information 32 recording information on the users who perform use registration of the delivery service using the delivery system 1, user delivery information 33 recording a request situation of delivery by the users, vehicle specification information 34 recording specifications of various types of cars (capacities of passenger compartments, capacities of carriage rooms, seat arrangement and the like), a beacon position information 35 indicating positions of beacons installed in a multi-story parking garage and the like, and the like are stored in addition to the control program 31.

The user information managing section 11 receives the information on the user (name, information on the vehicle 100 which is used, credit information used in settlement of a credit card or the like, and the like) that is transmitted from the user terminal 90 in response to the registration operation of the user Pt, and issues the QR code that is identification information of the user Pt. Further, the user information managing section 11 provides information on the virtual key for guest for unlocking the door of the vehicle 100 when an article is delivered to the vehicle 100. As will be described later, the information of the virtual key for guest is stored in the vehicle 100, so that it is possible to unlock and lock the door of the vehicle 100 by the virtual key.

Figure 12:
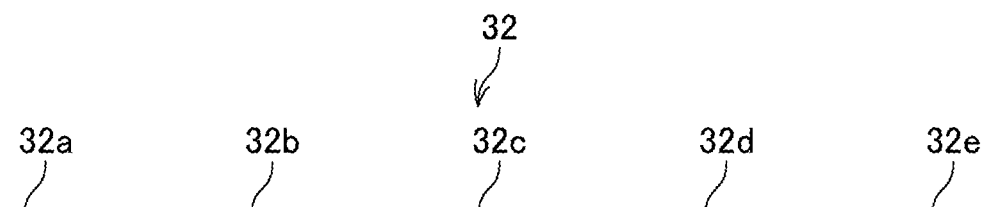
FIG. 12 is an explanatory diagram of user registration information.

As illustrated in FIG. 12, in the user registration information 32, a QR code 32b peculiar to each user, vehicle information 32c, a virtual key 32d for guest, and credit information 32e are recorded by being associated with an ID 32a of each user. The vehicle information 32c includes information (vehicle identification information) for identifying a vehicle such as a vehicle ID for communication, a vehicle model, a color, and a registration number. Further, as illustrated in FIG. 13, in the user delivery information 33, a QR code 33b which is issued, extended vehicle information 33c, parking position information 33d, a scheduled time of departure from the theme park and a delivery acceptance end time 33e, accepting store information 33f, purchased article information (a kind, a size, a number and the like of the purchased article), a storage condition 33h in a case of the purchased article being food (chocolate or the like), and an accommodation method 33i into vehicle corresponding to the size of the article are recorded by being associated with an ID 33a of the user, with respect to the article with the request of delivery being accepted.

Here, the vehicle position information Capi which is transmitted to the delivery system 1 from the vehicle 100 includes the information on the parking position of the vehicle 100, which is detected in the vehicle 100. Further, the vehicle room situation information Crsi includes a number of passengers of the vehicle 100 detected in the vehicle 100 (the number of passengers who ride on the vehicle 100 to come to the theme park 200), and a captured image of an inside of the vehicle room. The user information managing section 11 records the number of passengers of the vehicle 100 and the captured image of the inside of the vehicle room which are recognized from the vehicle room situation information Crsi, in the extended vehicle information 33c.

The vehicle position recognizing section 12 recognizes the parking position of the vehicle 100 based on the vehicle position information Capi which is transmitted from vehicle 100. The user information managing section 11 records the parking position of the vehicle 100 which is recognized by the vehicle position recognizing section 12, in the user delivery information 33. The delivery request accepting section 13 recognizes that the user Pt purchases the article by receiving the delivery request information Dc1 which is transmitted from the store terminal 211.

The article accommodation determining section 14 determines whether or not the article 212 requested to be delivered by the delivery request information Dc1 can be accommodated in the vehicle 100. The article accommodation determining section 14 recognizes a possible accommodation capacity of the vehicle room based on a prescribed accommodation capacity of the vehicle room (a carriage room CR and a passenger room PR) of the vehicle 100, the number of passengers, a loading situation of a carriage in the vehicle room of the vehicle 100 recognized from the captured image of the carriage room CR and the passenger room PR, and the like which are acquired from the extended vehicle information of the user delivery information 33. Subsequently, the article accommodation determining section 14 compares the possible accommodation capacity of the vehicle room and the size of the article 212, also considers a change of the accommodation possible area by seat arrangement of the vehicle 100, and determines whether or not it is possible to accommodate the article 212 in the vehicle 100.

Note that as for the loading situation of the carriage in the vehicle room of the vehicle 100, a method that uses load sensors provided in a front right seat 113a, a front left seat 113b, a rear seat 115, the carriage room CR and the like may be adopted, besides the method that uses the captured image of the camera. In this case, the loading situation of the carriage in the vehicle room can be estimated by recognizing whether or not the article is loaded, the size of the article (calculated from a contacting surface area), a weight of the article and the like, based on detected loads by the load sensors.

Figure 10:
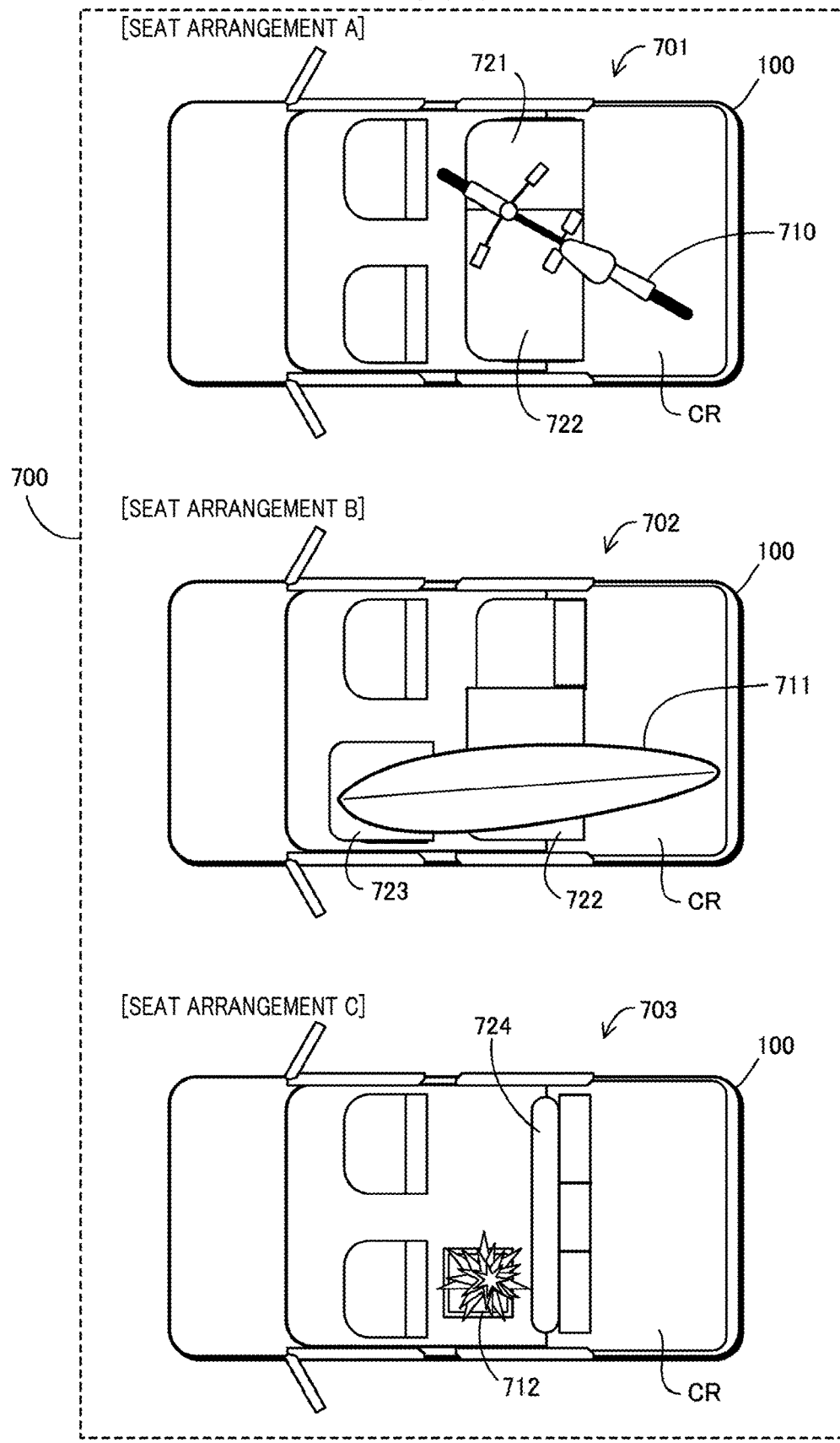
FIG. 10 is an explanatory view of seat arrangement of the vehicle.

Here, FIG. 10 illustrates an example 700 of the seat arrangement of the vehicle 100. Seat arrangement A illustrated in 701 is seat arrangement in which a seat backrest 721 of a rear right seat and a seat backrest 722 of a rear left seat are folded forward, and is capable of accommodating an article of a large size like a bicycle 710.

Further, seat arrangement B illustrated in 702 is seat arrangement in which a seat backrest 723 of a front left seat and the seat backrest 722 of the rear left seat are folded forward, and is capable of accommodating a long article like a surfboard 711. Further, seat arrangement C illustrated in 703 is seat arrangement in which a seat surface 724 of the rear seat is folded backward, and is capable of accommodating a tall article like a foliage plant.

The article accommodation determining section 14 also determines a possibility of accommodation by seat arrangement when the size of the article 212 is large, or when the article 212 is tall. Further, when a posture at the time of accommodating the article 212 (accommodation by being raised, accommodation by being laid, or the like) is designated, the article accommodation determining section 14 determines whether or not accommodation of the article 212 in the vehicle 100 is possible by also considering the posture of the article 212 at the time of accommodation.

Further, the article accommodation determining section 14 determines that accommodation of the article 212 is impossible when seat arrangement in which a seat equipped with a child seat is folded is necessary, or when the user of the vehicle makes setting to prohibit seat arrangement, even when it is possible to accommodate the article 212 by seat arrangement.

Accommodation impossible notifying section 15 transmits accommodation impossible notice indicating that accommodation is impossible to the store terminal 211 and the user terminal 90, when the article accommodation determining section 14 determines that it is impossible to accommodate the purchased article 212 in the vehicle 100. The vehicle use scheduled time recognizing section 16 recognizes the scheduled time of departure from the theme park 200 of the user Pt based on the information transmitted from the user terminal 90, based on the information which is transmitted from the user terminal 90. The scheduled time of departure is a scheduled time at which the user Pt uses the vehicle 100 next.

The delivery acceptance end time setting section 17 sets a delivery acceptance end time at which acceptance of delivery of the article to the vehicle 100 is ended based on the scheduled time of departure. For example, when the scheduled time of departure is 20 o'clock, the delivery acceptance end time is set so that delivery can be performed to the vehicle 100 ten minutes before the scheduled time of departure, with a time period required for pickup in the store and delivery to the vehicle 100 taken into consideration.

The delivery condition setting section 18 decides conditions (a delivery deadline time, a delivery route and the like) for delivering articles to respective vehicles based on delivery request information of the respective vehicles recorded in the user delivery information 33. The delivery request transmitting section 19 transmits the delivery request information for requesting delivery to the delivery company system 300 in accordance with the delivery conditions decided by the delivery condition setting section 18. The delivery company system 300 which receives the delivery request information transfers the delivery request information to the delivery center 310, whereby a delivery instruction is transmitted to the delivery person Pd from the delivery company system 300 and delivery is performed.

The door locking and unlocking recognizing section 20 recognizes whether the door is locked or unlocked, based on the detection information on unlocking or locking of the door of the vehicle 100, which is transmitted from the vehicle 100. The door locking and unlocking notifying section 21 notifies the user terminal 90 of a locked or unlocked situation of the door of the vehicle 100 which is recognized by the door locking and unlocking recognizing section 20.

When at least any one of the following condition 1 to condition 4 is established, the virtual key use restricting section 22 performs a process of making it impossible to unlock the door of the vehicle 100 by the virtual key for guest by the delivery person Pd after a time of establishment.

Condition 1 . . . When a first predetermined time period elapses after a time when the delivery person Pd unlocks the door of the vehicle 100 by the virtual key.

Condition 2 . . . When the delivery person Pd moves away from the vehicle 100 by a predetermined distance or more after the delivery person Pd unlocks the door of the vehicle 100 by the virtual key. It can be determined that the delivery person Pd moves away from the vehicle 100 by the predetermined distance or more, by detecting that the delivery person Pd moves from a state where the delivery person Pd is captured by any of external cameras 101a to 101d to a state where the delivery person Pd is not captured by any of the external cameras 101a to 101d, for example.

Condition 3 . . . When short-range wireless communication between the vehicle 100 and the delivery person terminal 330 by BR/EDR (Bluetooth Basic Rate/Enhanced Data Rate, Bluetooth is the registered trademark), BLE (Bluetooth Low Energy), NFC, Wi-Fi (registered trademark) or the like becomes impossible, after the delivery person Pd unlocks the door of the vehicle 100 by the virtual key.

Condition 4 . . . When a second predetermined time period elapses from a time point at which the virtual key is transmitted to the delivery person terminal 330 from the delivery system 1.

In this way, by restricting unlocking of the door of the vehicle 100 again by the virtual key that is used by the delivery person Pd to unlock the door of the vehicle 100, continuation of a state where unlocking of the door of the vehicle 100 by the person other than the owner of the vehicle 100 and the family members of the owner is possible can be avoided.

As a process of making it impossible to unlock the door of the vehicle 100 by the virtual key for guest, erasure of data of the virtual key for guest from the delivery person terminal 330, erasure of the data of the virtual key for guest from virtual key information 183 stored in a memory 180 of a vehicle control device 150 of the vehicle 100 or the like can be performed.

3. Configuration of Vehicle

Figure 3:
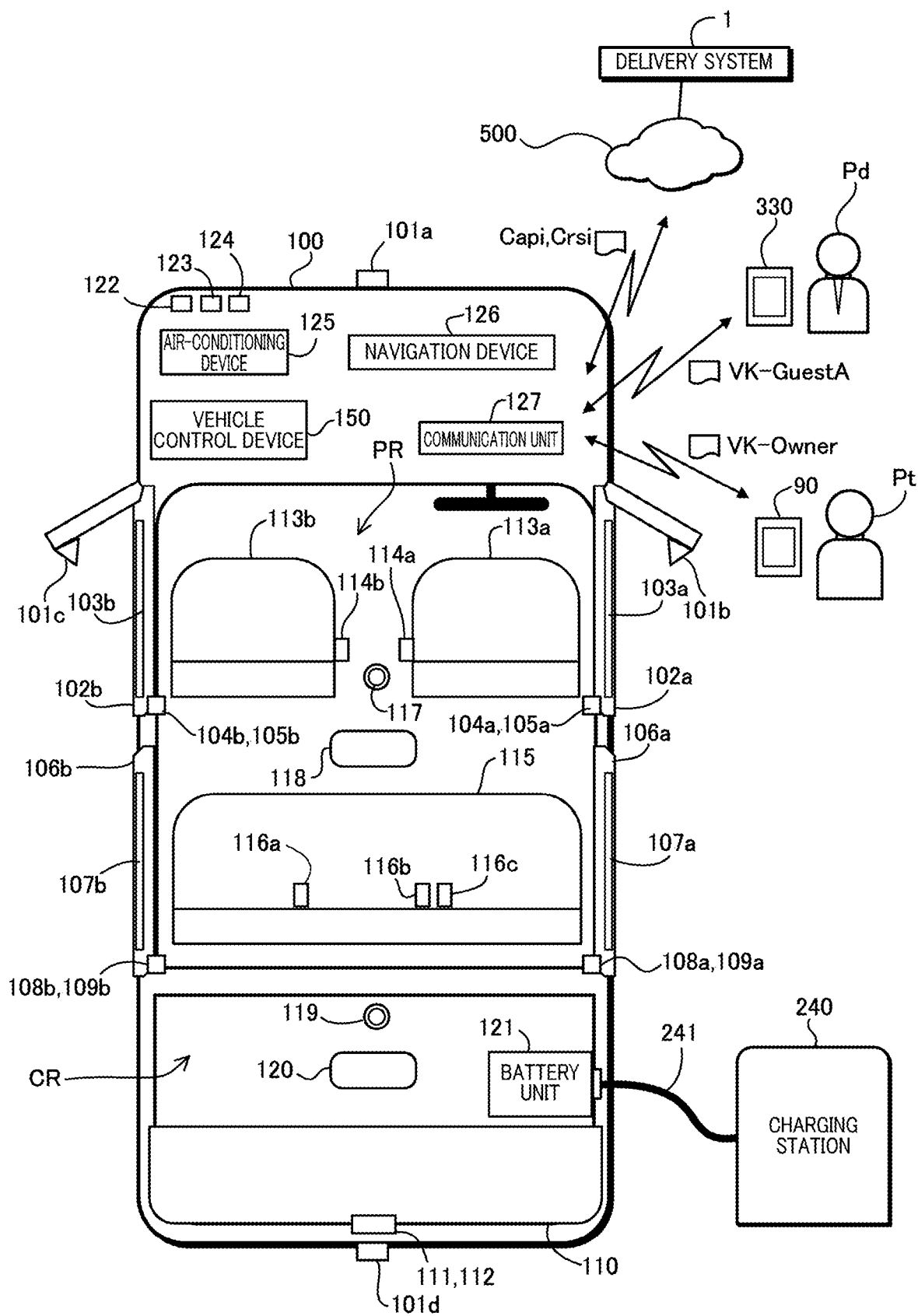
FIG. 3 is a configuration diagram of a vehicle.
Figure 4:
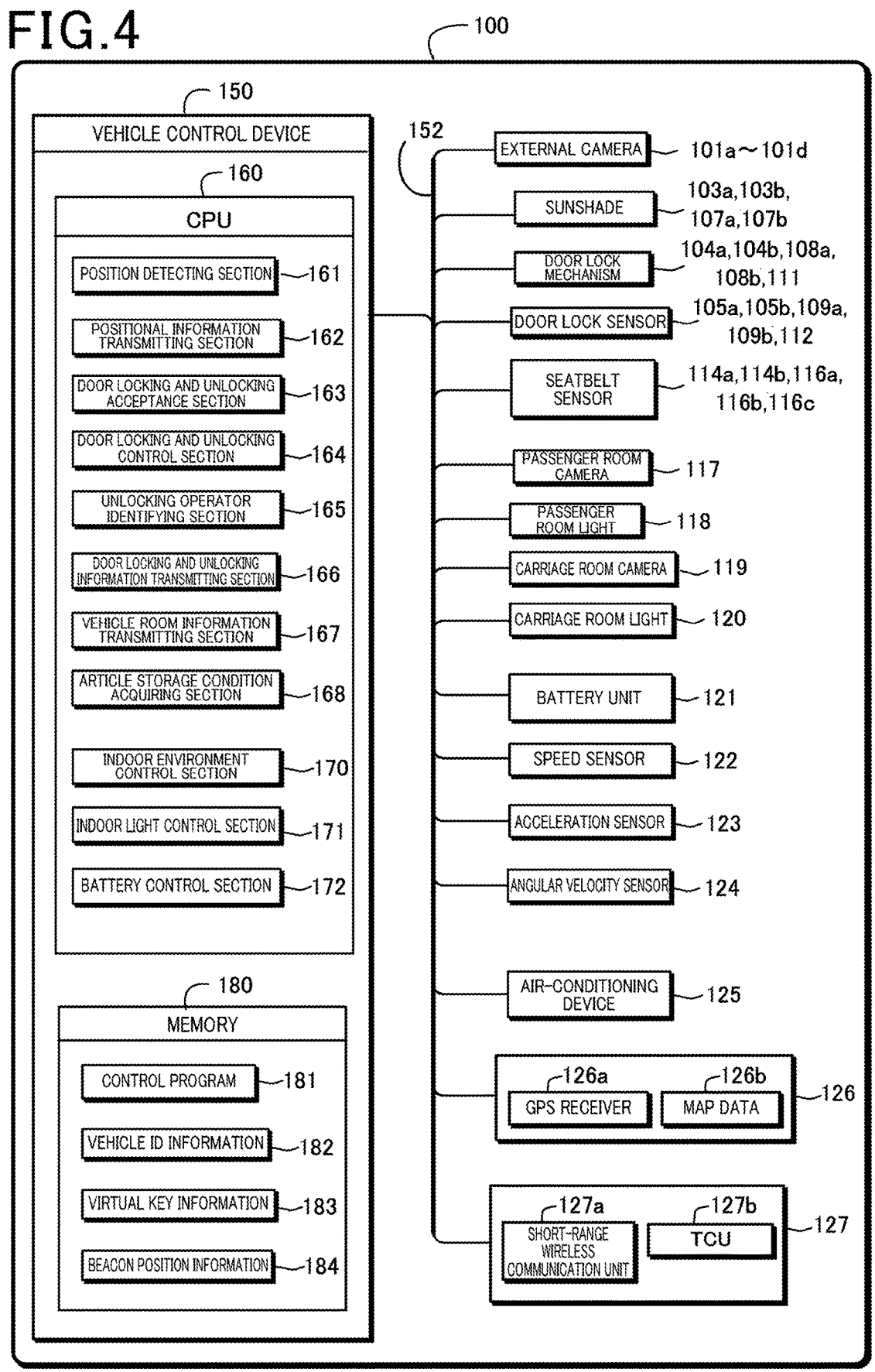
FIG. 4 is a control block diagram of the vehicle.

Next, FIG. 3 is a configuration diagram of the vehicle 100, and FIG. 4 is a control block diagram of the vehicle 100. With reference to FIG. 3, the vehicle 100 includes the external cameras 101a, 101b, 101c and 101d in a front, right, left and rear that capture surroundings of the vehicle 100, a front right sunshade 103a provided at a glass portion of a front right door 102a, a front right door lock mechanism 104a that locks and unlocks the front right door 102a, and a front right door lock sensor 105a that detects locking and unlocking of the front right door 102a.

Further, the vehicle 100 includes a front left sunshade 103b provided at a glass portion of a front left door 102b, a front left door lock mechanism 104b that locks and unlocks the front left door 102b, a front left door lock sensor 105b that detects locking and unlocking of the front left door 102b, a rear right sunshade 107a provided at a glass portion of a rear right door 106a, a rear right door lock mechanism 108a that locks and unlocks the rear right door 106a, a rear right door lock sensor 109a that detects locking and unlocking of the rear right door 106a, a sunshade 107b provided at a glass portion of a rear left door 106b, a rear left lock mechanism 108b that locks and unlocks the rear left door 106b, and a rear left door lock sensor 109b that detects locking and unlocking of the rear left door 106b. Note that the sunshades 103a, 103b, 107a and 107b are configured by a movable curtain that shields window glasses of the doors 102a, 102b, 106a and 106b, window glasses having a light controlling function, or the like.

Further, the vehicle 100 includes a carriage room door lock mechanism 111 that locks and unlocks a carriage room door 110, a carriage room door lock sensor 112 that detects locking and unlocking of the carriage room door 110, a front right seat seatbelt sensor 114a that detects attachment and detachment of a seatbelt of a front right seat (driver's seat) 113a, a front left seat seatbelt sensor 114b that detects attachment and detachment of a seatbelt of a front left seat 113b, rear seat seatbelt sensors 116a, 116b and 116c that detect attachment and detachment of seatbelts of a rear seat 115, a passenger room camera 117 that captures an inside of a passenger room PR, a passenger room light 118 that illuminates the inside of the passenger room PR, a carriage room camera 119 that captures an inside of the carriage room CR, a carriage room light 120 that illuminates an inside of the carriage room CR, and a battery unit 121.

The battery unit 121 includes a battery that is a power source of electric and electronic equipment of the vehicle 100 and a charging circuit for the battery and the like, and charges the battery by electric power that is supplied from a charging station 240 when the battery unit 121 is connected to the charging station 240 by an outlet cable 241. When the vehicle 100 and the charging station 240 are adapted to wireless charging, connection by the outlet cable 241 is not necessary, and wireless charging is performed between the battery unit 121 and the charging station 240.

Further, the vehicle 100 includes a speed sensor that detects a speed of the vehicle 100, an acceleration sensor 123 that detects acceleration of the vehicle 100, an angular velocity sensor 124 that detects an angular velocity of the vehicle 100, an air-conditioning device 125 that performs air-conditioning in an inside of the vehicle room, a navigation device 126 that performs detection of a present position of the vehicle 100, guide to a destination, and the like, a communication unit 127 that performs communication with an outside, and the vehicle control device 150 that performs overall control of the vehicle 100.

The user Pt of the vehicle 100 unlocks and locks the door of the vehicle 100 by a virtual key VK-Owner for owner by performing communication with the communication unit 127 by operating the user terminal 90. Further, the delivery person Pd unlocks and locks the door of the vehicle 100 by a virtual key VK-Guest for guest by performing communication with the communication unit 127 by operating the delivery person terminal 330.

With reference to FIG. 4, the vehicle control device 150 is communicably connected to the external cameras 101a to 101d, the sunshades 103a, 103b, 107a, and 107b, the door lock mechanisms 104a, 104b, 108a, 108b, and 111, the door lock sensors 105a, 105b, 109a, 109b, and 112, the seatbelt sensors 114a, 114b, 116a, 116b, and 116c, the passenger room camera 117, the passenger room light 118, the carriage room camera 119, the carriage room light 120, the battery unit 121, a speed sensor 122, the acceleration sensor 123, the angular velocity sensor 124, the air-conditioning device 125, the navigation device 126 and the communication unit 127, via a CAN (Controller Area Network) 152.

The navigation device 126 has a GPS receiver 126a that receives a signal transmitted from a GPS (Global Positioning System) satellite, and detects a present position (latitude, longitude) of the vehicle 100, and a map data 126b stored in a memory (not illustrated). The navigation device 126 performs route guide to a destination based on the present position of the vehicle 100 which is detected by the GPS receiver 126a, and the map data 126b.

The communication unit 127 includes a short-range wireless communication unit 127a, and a TCU (Telematics Communication Unit) 127b. The short-range wireless communication unit 127a performs short-range wireless communication between the user terminal 90 and the delivery person terminal 330 by communication standards such as BR/EDR, BLE, NFC, and Wi-Fi. The TCU 127b performs communication with the delivery system 1 via a communication network 500.

In the memory 180, data such as a control program 181 of the vehicle 100, vehicle ID information 182 that is used at a time of performing communication with an external device by the communication unit 127, and virtual key information 183 in which the virtual key used in performing unlocking and locking by communication with the terminal device is recorded are stored. The vehicle ID information 182 includes a vehicle ID (IP address or the like) for network communication which is used in performing communication with the delivery system 1 by the TCU 127b of the communication unit 127, and a vehicle ID for short-range wireless communication (BR/EDR, BLE, an authentication code of NFC, a MAC (Media Access Control) address for Wi-Fi connection or the like) that is used in performing communication with the user terminal 90 and the delivery person terminal 330, by the short-range wireless communication unit 127a.

The vehicle control device 150 is an electronic circuit unit configured by a CPU 160, the memory 180, an interface circuit not illustrated and the like. The CPU 160 functions as a position detecting section 161, a positional information transmitting section 162, a door locking and unlocking acceptance section 163, a door locking and unlocking control section 164, an unlocking operator identifying section 165, a door locking and unlocking information transmitting section 166, a vehicle room information transmitting section 167, an article storage condition acquiring section 168, an indoor environment control section 170, an indoor light control section 171, and a battery control section 172, by reading and executing the control program 181 of the vehicle 100 stored in the memory 180.

A configuration in which the battery control section 172 detects a remaining charge amount (corresponding to a remaining energy amount of the present invention) of the battery corresponds to a remaining energy amount detecting section of the present invention. Further, a configuration in which the battery control section 172 detects that the charging station 240 (corresponding to an energy replenishment device of the present invention) is connected to the battery unit 121, and electric power is supplied from the charging station 240 corresponds to an energy supply detecting section of the present invention.

Further, when the vehicle 100 is an electric car, the battery corresponds to a power source of the present invention. Further, when the vehicle 100 uses fossil fuel such as gasoline or hydrogen as fuel, an entire configuration including a fuel tank, a generator, a fuel battery and the like corresponds to the power source of the present invention, fuel corresponds to energy, and a remaining amount of the fuel in the fuel tank corresponds to an energy remaining amount of the present invention. In this case, fuel is supplied to the vehicle 100 from the energy replenishment device, instead of electric power.

The position detecting section 161 detects the present position (latitude, longitude) of the vehicle 100 based on the position detection data transmitted from the GPS receiver 126a. Further, in indoors where it is impossible to receive a signal from the GPS satellite, such as a multistory parking garage, the position detecting section 161 receives identification information (beacon ID) peculiar to each beacon which is transmitted from the beacon, as illustrated in FIG. 9.

Figure 9:
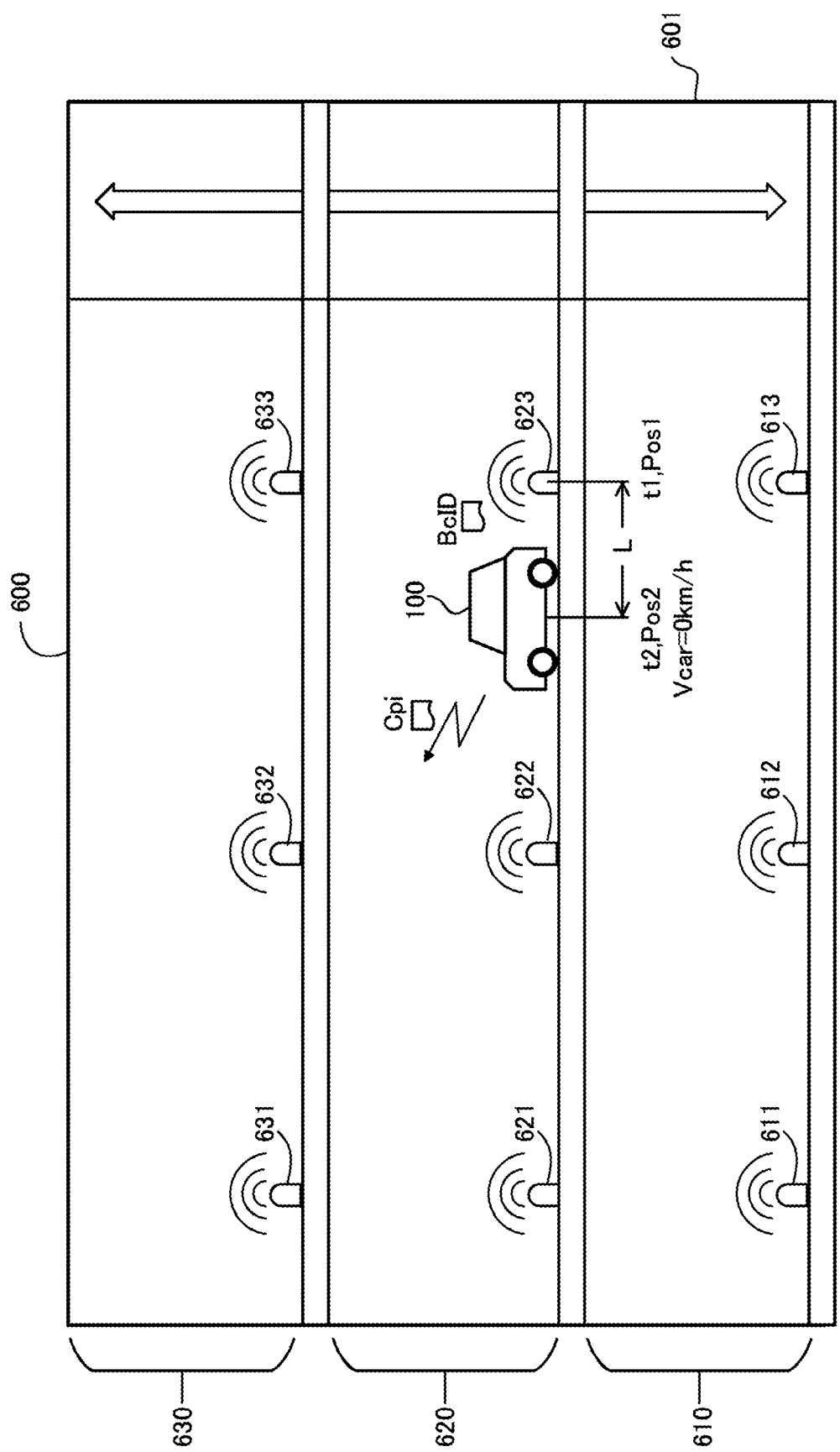
FIG. 9 is an explanatory view of a detection process of a parking position using beacons.

FIG. 9 illustrates a situation in which the vehicle 100 is parked on a second floor 620 of the three-story parking garage 600. On a first floor 610 of the multistory parking garage 600, beacons 611, 612 and 613 are installed at predetermined intervals. Likewise, on the second floor 620, beacons 621, 622 and 623 are installed, and on a third floor 630, beacons 631, 632 and 633 are installed.

The position detecting section 161 performs communication by BLE with a beacon installed in a vicinity of the own vehicle 100, and receives a beacon ID transmitted from the beacon. The positional information transmitting section 162 transmits a parking position (latitude, longitude) of the vehicle 100 detected by the position detecting section 161, or the beacon ID received by the position detecting section 161 directly before the vehicle 100 is parked, and information on a speed detected by the speed sensor 122 in a period from a time point t1 at which the beacon ID is received until a time point t2 at which the vehicle 100 is parked to the delivery system 1.

In the beacon position information 35 (refer to FIG. 2) stored in the memory 30 of the delivery system 1, installed position (facility names, floor numbers, latitudes, longitudes) of the respective beacons are recorded by being associated. Therefore, when the vehicle position recognizing section 12 of the delivery system 1 receives the beacon ID transmitted from the vehicle 100, the vehicle position recognizing section 12 refers to the beacon position information 35, and can recognize an installed position Pos1 (floor, latitude, longitude) of a beacon that is a transmission source of the beacon ID.

Further, the vehicle position recognizing section 12 calculates a moving distance of the vehicle 100 from the installed position Pos1 of the beacon by performing time integration of the speed from the time point t1 at which the vehicle 100 receives the beacon ID to the time point t2 at which the vehicle 100 is parked, based on the speed information received from the vehicle 100. Note that a moving direction of the vehicle 100 can be estimated based on floor disposition information of the multistory parking garage 600, transition of the received beacon ID, an angular velocity of the vehicle 100 which is detected by the angular velocity sensor 124 and the like.

The vehicle position recognizing section 12 estimates a parking position Pos2 of the vehicle 100 based on the installed position Pos1 (floor number, latitude, longitude) of the beacon corresponding to the beacon ID received directly before the vehicle 100 is parked, and the moving distance and the moving direction from the beacon to the parking position.

A configuration may be adopted, in which the moving distance from the installed position of the beacon to the parking position is estimated by using information on the acceleration of the vehicle 100, in place of the speed of the vehicle 100, or with the speed of the vehicle 100. In this case, the vehicle position recognizing section 12 may estimate the parking position of the vehicle 100 by assuming that as a deceleration (negative acceleration) of the vehicle 100 detected at the time point when the beacon ID is received is larger, a distance from the installed spot of the beacon to the parking position of the vehicle 100 becomes shorter, for example.

Further, a configuration may be adopted, in which the vehicle control device 150 of the vehicle 100 is equipped with the function of the vehicle position recognizing section 12, and an estimation process of the parking position of the vehicle 100 based on the beacon ID is performed on a vehicle 100 side. In this case, beacon position information 184 similar to the beacon position information 35 illustrated in FIG. 2 is stored in the memory 180 of the vehicle 100, and information on the position (the parked floor, latitude, longitude) of the vehicle 100 in the multistory parking garage 600 is transmitted to the delivery system 1 from the vehicle 100.

Further, a function of a car finder may be provided by transmitting information on the parking position of the vehicle 100 which is estimated based on the beacon ID, to the user terminal 90. Thereby, the user Pt can easily find the vehicle 100 by confirming the parking position of the vehicle 100 which is displayed on the user terminal 90.

When the door locking and unlocking acceptance section 163 receives an unlocking request or a locking request of the vehicle 10 from outside by the short-range wireless communication unit 127*a*, the door locking and unlocking acceptance section 163 refers to the virtual key information 183, and determines whether or not the virtual key included in the unlocking request or the locking request is recorded in the virtual key information 183. Here, in the virtual key information 183, an operation target person 183*a* permitting unlocking of the vehicle 100 by the virtual key and a virtual key 183*b* to be used are recorded by being associated with each other, as illustrated in FIG. 14.

Figure 14:
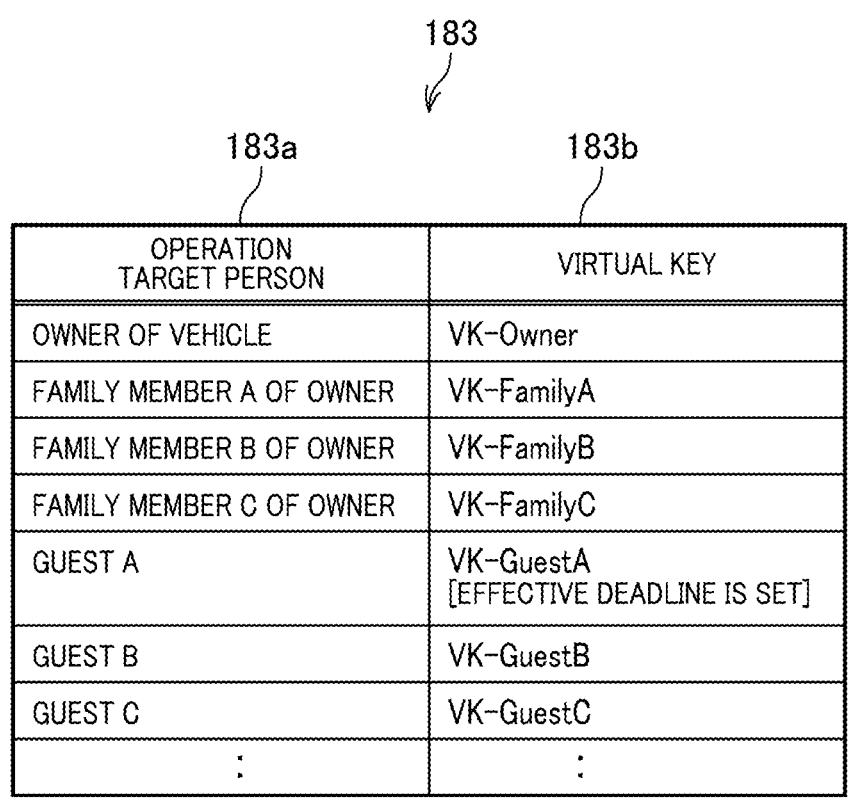
FIG. 14 is an explanatory diagram of virtual key registration information.
Figure 15:
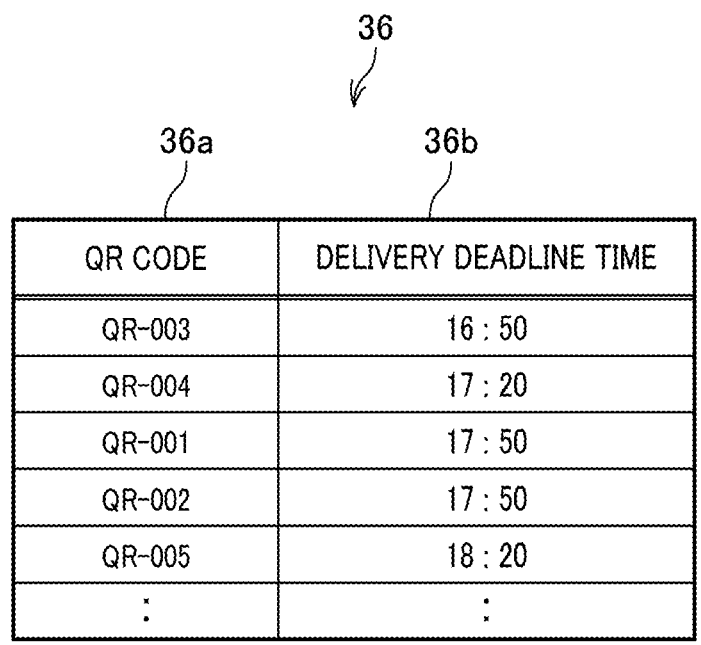
FIG. 15 is an explanatory diagram of a user list in order of scheduled time of delivery.

In an example of FIG. 14, as the operation target person, the owner of the vehicle 100, family members A, B and C of the owner of the vehicle, and guests A, B and C are registered. The family members A, B and C of the owner of the vehicle 100 have a predetermined relationship with the owner of the vehicle 100 (family relationship in this case), and therefore are categorized as persons accustomed to the operation of the vehicle 100. As the persons having the predetermined relationship with the owner of the vehicle 100 like this, a person who lives with the owner of the vehicle 100 and frequently uses the vehicle 100 and the like are also applicable, in addition to the family members.

As the guests A, B, C and the like, a person who borrows the vehicle 100 from the owner of the vehicle 100 or the like is registered, and in the present embodiment, the delivery person Pd is registered as the guest. The guest is assumed to be unaccustomed to the operation of the vehicle.

The door locking and unlocking acceptance section 163 accepts a request when the virtual key included in an unlocking request or a locking request is registered in the virtual key information 183, and rejects the request when the virtual key is not registered in the virtual key information 183.

The door locking and unlocking control section 164 unlocks or locks the doors 102*a*, 102*b*, 106*a*, 106*b* and 110 by operating the door lock mechanisms 104*a*, 104*b*, 108*a*, 108*b* and 111, in response to the request accepted by the door locking and unlocking acceptance section 163. When the request accepted by the door locking and unlocking acceptance section 163 designates unlocking or locking of some of the doors, the door locking and unlocking control section 164 performs unlocking or locking of only the doors designated by the request.

For example, when the request accepted by the door locking and unlocking acceptance section 163 requires unlocking of the doors except for the front right door 102*a* which is the door of the driver's seat, the door locking and unlocking control section 164 permits unlocking of the front left door 102*b*, the rear right door 106*a*, the rear left door 106*b* and the carriage room door 110 except for the front right door 102*a*, and prohibits unlocking of the front right door 102*a*. By prohibiting unlocking of the door of the driver's seat, and permitting unlocking of the doors other than the door of the driver's seat in this way, a situation can be avoided, in which the delivered article is accommodated in the driver's seat, and the driver has to remove the delivered article when sitting on the driver's seat.

When the request is permitted by the door locking and unlocking acceptance section 163, the unlocking operator identifying section 165 refers to the virtual key information 183, and determines whether the virtual key included in the unlocking request is registered for the owner of the vehicle 100, or the family members of the owner (designated operators), or whether the virtual key is registered for the guests (undesignated operators who are operators other than the designated operators).

Here, the designated operators are set by assuming the operators who are accustomed to the operation of the vehicle 100, and the undesignated operators are set by assuming the operators who are not accustomed to the operation of the vehicle 100. In the present embodiment, the owner of the vehicle 100 and the family members of the owner are set as the designated operators, but an acquaintance and the like of the owner who frequently borrow and use the vehicle 100 may be also included in the designated operators.

Further, when the vehicle 100 is a vehicle which is lent out by a vehicle lending service (for example, a car rental service, and a car sharing service), a manager who lends the vehicle 100 may be set as the designated operator, and a user who rents and uses the vehicle 100 may be set as the undesignated operator.

The indoor light control section 171 turns on the passenger room light 118 and the carriage room light 120 irrespective of the operation of the lighting switches (not illustrated) when it is determined that the virtual key included in the unlocking request is registered for the guest by the unlocking operator identifying section 165. Thereby, the guest such as the delivery person Pd who is not accustomed to the operation of the vehicle 100 can quickly turn on the passenger room light 118 and the carriage room light 120 when the guest such as the delivery person Pd who is unaccustomed to the operation of the vehicle 100 rides on the vehicle 100 or loads carriage during the nighttime.

The door locking and unlocking information transmitting section 166 transmits the door locking and unlocking information notifying of unlocking or locking, to the delivery system 1 via the TCU 127*b*, when unlocking or locking of any of the doors 102a, 102b, 106a, 106b and 110 is detected by the door lock sensors 105a, 105b, 109a, 109b and 112.

The vehicle room information transmitting section 167 recognizes the number of passengers on board the vehicle 100 when the vehicle reaches the theme park 200 by detecting a use situation of the respective seats by the seatbelt sensors 114a, 114b, 116a, 116b and 116c, or by recognizing the passengers from the image of the inside of the passenger room captured by the passenger room camera 117. Further, the vehicle room information transmitting section 167 acquires the image of the inside of the passenger room captured by the passenger room camera 117, and an image of an inside of the carriage room CR which is captured by the carriage room camera 119. Subsequently, the vehicle room information transmitting section 167 transmits the vehicle room information including the number of passengers in the vehicle 100 and the images of the passenger room PR and the carriage room CR to the delivery system 1 via the TCU 127b. The article accommodation determining section 14 of the delivery system 1 recognizes a vacant space for the article to the carriage room CR and the passenger room PR based on the vehicle room information received from the vehicle 100, and determines whether or not it is possible to accommodate the article to the vehicle 100.

The article storage condition acquiring section 168 receives article storage condition information which is transmitted from the delivery person terminal 330 via the short-range wireless communication unit 127a. The indoor environment control section 170 operates the air-conditioning device 125 so that the storage condition indicated by the article storage condition information acquired by the article storage condition acquiring section 168 is kept. Here, a time point at which the air-conditioning device 125 starts operation is set at a time point at which the article is accommodated in the vehicle 100, a time that is a predetermined time before (for example, ten minutes before) an expected time point at which the article is accommodated in the vehicle 100, or the like. In this case, a timing for transmitting the article storage condition information from the delivery person terminal 330 is determined in accordance with the time point at which the operation of the air-conditioning device 125 is started.

For example, when the storage condition of the article to be accommodated in the vehicle 100 is 25° C. or less, and a temperature in the vehicle room exceeds 25° C., the indoor environment control section 170 determines 25° C. which is the storage temperature as a set temperature of the air-conditioning device 125. The air-conditioning device 125 operates so that the detection temperature of a vehicle room temperature sensor (not illustrated) that detects the temperature in the vehicle room becomes close to the storage temperature. Further, when the vehicle room temperature is difficult to lower, or when avoiding a direct sunlight is the storage condition, the indoor environment control section 170 operates the sunshades 103a to 103d to shield sunlight into the vehicle room. Further, when the temperature of the storage condition of the article is higher than the temperature in the vehicle room, the indoor environment control section 170 heats the inside of the vehicle room by the air-conditioning device 125.

Further, the indoor environment control section 170 operates the air-conditioning device 125 so that the remaining amount of the battery of the battery unit 121 which is recognized by the battery control section 172 is kept at a lower limit amount (corresponding to a lower limit energy amount of the present invention) or more. As illustrated in FIG. 3, when the battery unit 121 is connected to the charging station 240, the air-conditioning device 125 can be operated by the electric power supplied from the charging station 240, so that the air-conditioning device 125 can be operated without a restriction.

On the other hand, when the battery unit 121 is not connected to the charging station 240, the air-conditioning device 125 is operated by the electric power supplied from the battery unit 121. Therefore, the indoor environment control section 170 operates the air-conditioning device 125 within a range in which the remaining amount of the battery does not become a lower limit amount or less. The indoor environment control section 170 transmits a notice urging to return to the vehicle 100 to the user terminal 90 when there is the fear that the remaining amount of the battery becomes a threshold or less.

Further, the battery control section 172 transmits the remaining amount of the battery, and information on presence or absence of connection to the charging station 240 to the delivery system 1. When the vehicle 100 is not charged by the charging station 240 when the user Pt purchases the article 212, the accommodation impossible notifying section 15 of the delivery system 1 determines whether it is possible or impossible to keep the remaining amount of the battery at a threshold or more, and keep the inside of the room of the vehicle 100 in an environment satisfying the storage condition by operating the air-conditioning device 125 or the like, in a period from the scheduled time of delivery to the scheduled time of departure from the theme park 200 of the user Pt.

The accommodation impossible notifying section 15 notifies the store terminal 211 and the user terminal 90 that it is impossible to store the article 212 in the vehicle 100 when determining that it is impossible to keep the inside of the room of the vehicle 100 in the environment satisfying the storage condition. By urging the user Pt to stop delivery of the article 212 to the vehicle 100 by the notice, quality of the article 212 can be avoided from deteriorating while the article 212 is stored in the room of the vehicle 100. Further, when it is determined that it is impossible to keep the inside of the room of the vehicle 100 in the environment satisfying the storage condition, delivery may not be accepted.

Here, the configuration in which the accommodation impossible notifying section 15 acquires the scheduled time of delivery of the article 212 to the vehicle 100 and the scheduled time of departure from the theme park 200 (a scheduled time of start of use of the vehicle 100) of the user Pt from the user delivery information 33, the delivery start time by the delivery route RTd and the like corresponds to a time information acquiring section of the present invention. Further, the configuration in which the accommodation impossible notifying section 15 determines whether it is possible or not to store the article 212 in the vehicle 100, and notifies that accommodation is impossible corresponds to a storage impossible notifying section of the present invention. Further, the air-conditioning device 125 and the sunshades 103a, 103b, 107a and 107b correspond to the on-vehicle device of the present invention.

3. Processes from Delivery Request of Article to Delivery Completion

Next, a series of processes executed by the delivery system 1, the store terminal 211, the delivery person terminal 330, the vehicle 100 and the like in a process from purchase of the article 212 to delivery completion illustrated in FIG. 1 will be described based on flowcharts illustrated in FIGS. 5 to 8.

3-1. User Registration to Setting of Delivery Acceptance Time

Figure 5:
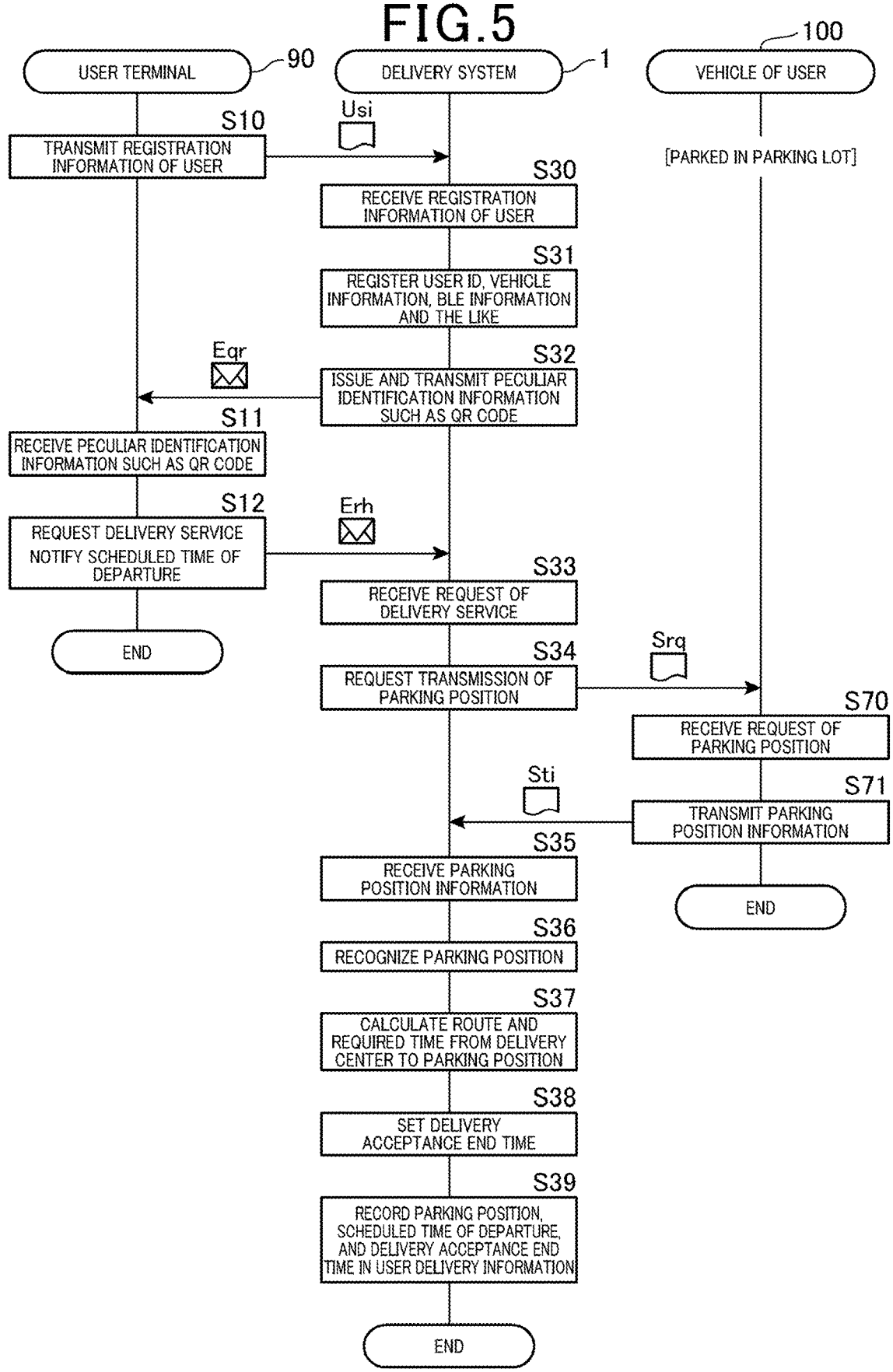
FIG. 5 is an explanatory diagram of use registration process of a delivery service provided by the delivery system, and a setting process of delivery conditions.

First, in accordance with a flowchart illustrated in FIG. 5, a registration process for the user Pt to use the delivery service provided by the delivery system 1, and a setting process of a delivery acceptance time to the user Pt will be described.

The user Pt browses a webpage provided by the delivery system 1 by the user terminal 90 to use the delivery service provided by the delivery system 1, and inputs information necessary for registration in a registration application screen. The user terminal 90 transmits registration information Usi that is inputted by the user Pt to the delivery system 1 in step S10 in FIG. 5. The registration information Usi includes the ID of the user Pt, information on the vehicle 100 (the vehicle ID for communication, the model of the vehicle, the color, and the like) used by the user Pt, and the like. The vehicle ID for communication includes a vehicle ID (IP address and the like) for network communication that is used in performing communication with the delivery system 1 by the TCU 127b of the communication unit 127, and the vehicle ID (BR/EDR, BLE, the authentication code of NFC, the MAC address for Wi-Fi connection or the like) that is used in performing communication by the short-range wireless communication unit 127a with the vehicle 100.

The delivery system 1 receives the registration information Usi of the user in step S30. In subsequent step S31, the user information managing section 11 of the delivery system 1 records the user ID, the vehicle information, the virtual key, the settlement information and the like which are acquired from the registration information Usi of the user Pt in the user registration information 32. Since the vehicle information includes the vehicle ID for communication, communication via the communication network 500 between the delivery system 1 and the vehicle 100 and the short-range wireless communication between the delivery person terminal 330 and the vehicle 100 become possible by using the vehicle ID.

The user information managing section 11 of the delivery system 1 issues the QR code which is identification information peculiar to the user Pt to record the QR code in the user registration information 32, and transmits QR code notice Eqr including data of the QR code to the user terminal by an electronic mail or the like, in next step S32. The user terminal 90 receives the QR code notice Eqr in step S11, and transmits a request notice Erh of the delivery service including the scheduled time of departure which is inputted by the user Pt to the delivery system 1 by an electronic mail or the like in subsequent step S12.

The delivery system 1 receives the request notice Erh of the delivery service in step S33. In subsequent step S34, the vehicle position recognizing section 12 of the delivery system 1 transmits a parking position request Srq requesting transmission of the parking position to the vehicle 100. The positional information transmitting section 162 of the vehicle 100 receives the parking position request Srq in step S70. In subsequent step S71, the positional information transmitting section 162 transmits information Sti (latitude, longitude, beacon ID, speed of the vehicle 100 in a period from the reception time of the beacon ID to the parking time, and the like) on the parking position of the vehicle 100, which is detected by the position detecting section 161 to the delivery system 1.

The vehicle position recognizing section 12 of the delivery system 1 receives the information Sti on the parking position in step S35, and recognizes the parking position of the vehicle 100 based on the information Sti on the parking position in subsequent step S36. In next step S37, the delivery acceptance end time setting section 17 of the delivery system 1 sets the delivery acceptance end time in the store 210, based on the scheduled time of departure of the user Pt, a required time from the store 210 to the delivery center 310, a required time from the delivery center 310 to the parking position of the vehicle 100 and the like.

In next step S39, the user information managing section 11 records the parking position of the vehicle 100, the scheduled time of departure, and the delivery acceptance end time in the user delivery information 33.

3-2. Processes from Purchase of Article to Delivery Acceptance

Figure 6:
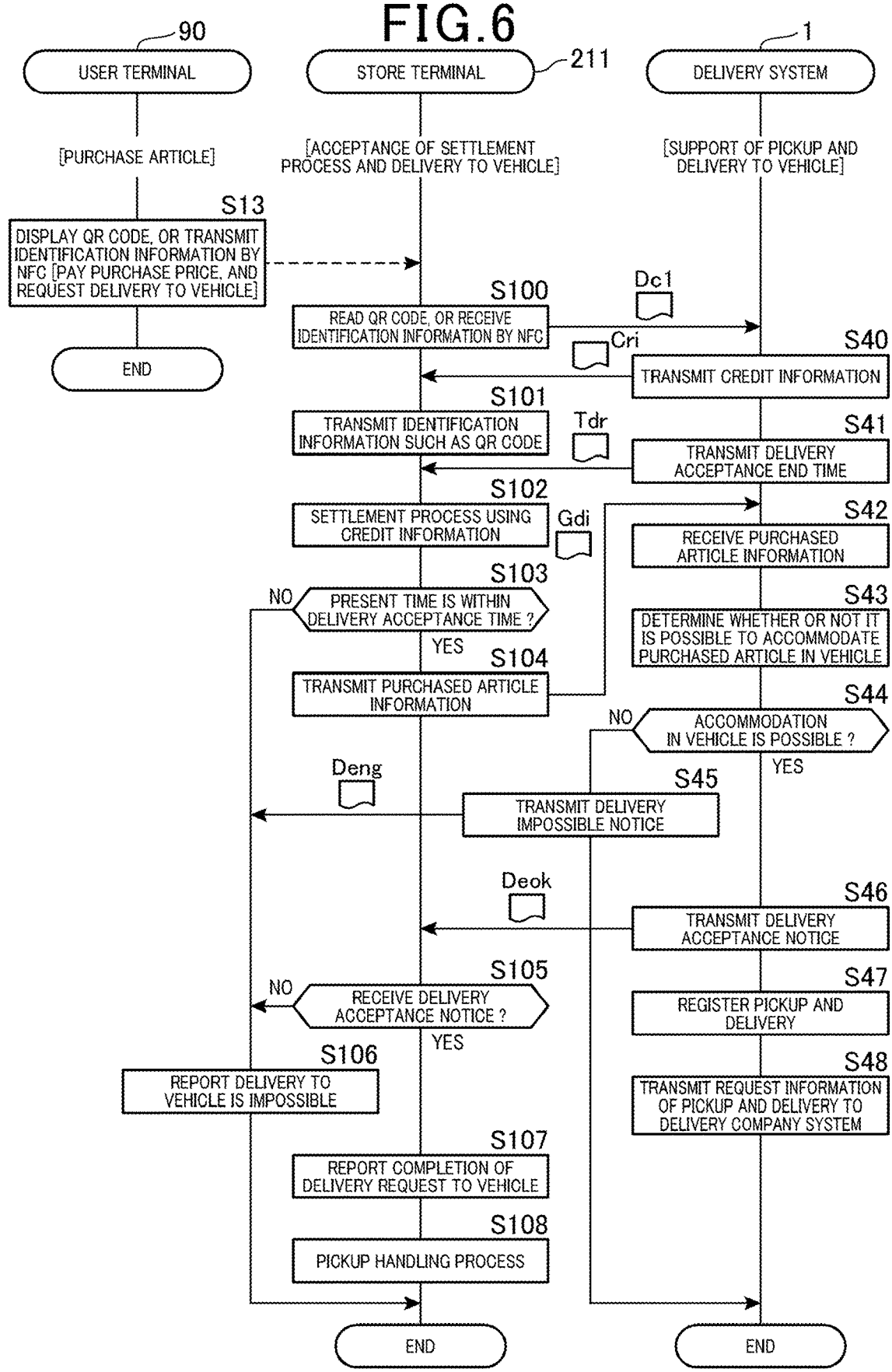
FIG. 6 is an explanatory diagram of processes according to purchase of an article and a delivery request in a store.

Next, in accordance with a flowchart illustrated in FIG. 6, a series of process corresponding to purchase of the article 212 in the store 210 by the user Pt, and a delivery request of the purchased article 212 to the vehicle 100 will be described.

The user terminal 90 displays the QR code in accordance with the operations of payment of the price at the time of the user Pt purchasing the article 212 in the store 210, and the delivery request to the vehicle 100. The store terminal 211 reads the QR code displayed in the user terminal 90 in step S100, and transmits the delivery request information Dc1 including the QR code to the delivery system 1 in subsequent step S101.

The user information managing section 11 of the delivery system 1 refers to the user registration information 32, acquires the settlement information Cri recorded by being associated with the QR code, and transmits the settlement information Cri to the store terminal 211, in step S40. The store terminal 211 performs a settlement process of the article 212 by using the settlement information Cri in step S102.

In step S41, the delivery acceptance end time setting section 17 of the delivery system 1 refers to the user registration information 32, acquires the delivery acceptance end time recorded by being associated with the QR code, and transmits information Tdr on the delivery acceptance end time to the store terminal 211. The store terminal 211 refers to the information Tdr on the delivery acceptance end time and determines whether or not a present time is within the delivery acceptance time, in step S103.

The store terminal 211 advances the process to step S104 when the present time is within the delivery acceptance time, and transmits the purchased article information Gbi including the article number, size, designation of a top and bottom at the time of accommodation and the like of the purchased article 212 to the delivery system 1. When the delivery request accepting section 13 of the delivery system 1 receives the purchased article information Gbi including the QR code in step S42, the delivery request accepting section 13 refers to the user registration information 32, and recognizes that the user Pt acquires the article.

In subsequent step S43, the article accommodation determining section 14 determines whether or not it is possible to accommodate the article 212 into the vehicle 100, based on the information on the size of the purchased article 212 recognized from the purchased article information Gbi, the number of passengers of the vehicle 100 acquired from the user delivery information 33, the accommodation situation of the carriage in the passenger room PR and the carriage room CR, the seat arrangement of the vehicle 100 and the like.

Subsequently, when the article accommodation determining section 14 determines that it is possible to accommodate the article 212 into the vehicle 100, the article accommodation determining section 14 advances the process to step S46, and transmits a delivery acceptance notice Deok to the store terminal 211. In subsequent step S47, the user information managing section 11 writes information on the store 210 accepting delivery (acceptance store information), information on the article 212 required to be delivered (delivered article information), and information on the storage conditions of the article 212 and the accommodation method (the accommodation position, seat arrangement and the like) by which accommodation is determined to be possible by the article accommodation determining section 14, into the user delivery information 33.

In next step S48, the delivery request transmitting section 19 generates the delivery request information Dc2 (refer to FIG. 1) including the QR code of the user Pt recorded in the user delivery information 33, the vehicle information, the vehicle position information, the purchase store information, purchased article information, the storage condition, the accommodation method and the like, and transmits the delivery request information Dc2 to the delivery center 310 via the delivery company system 300.

When the article accommodation determining section 14 determines that it is impossible to accommodate the purchased article 212 into the vehicle 100 in step S44, the article accommodation determining section 14 advances the process to step S45. In step S45, the accommodation impossible notifying section 15 transmits a delivery impossible notice Deng to the store terminal 211. The store terminal 211 determines whether or not the store terminal 211 receives the delivery acceptance notice Deok from the delivery system 1 in step S105.

When the store terminal 211 receives the delivery acceptance notice Deok, the store terminal 211 advances the process to step S107, and informs the sales clerk Pc that the delivery request of the purchased article 212 to the vehicle 100 is completed by indication or the like onto a display (not illustrated). When it is determined that the present time is outside the delivery acceptance time in step S103, and when it is determined that the delivery impossible notice Deng is received in step S105, the store terminal 211 advances the process to step S106. Subsequently, the store terminal 211 informs the sales clerk Pc that delivery of the purchased article to the vehicle 100 is impossible by indication or the like onto the display. In this case, the sales clerk Pc notifies the user Pt that delivery to the vehicle 100 is impossible and proposes an alternative plan such as delivery to home, or use of a coin locker.

3-3. Support Process for Delivery Preparation

Figure 7:
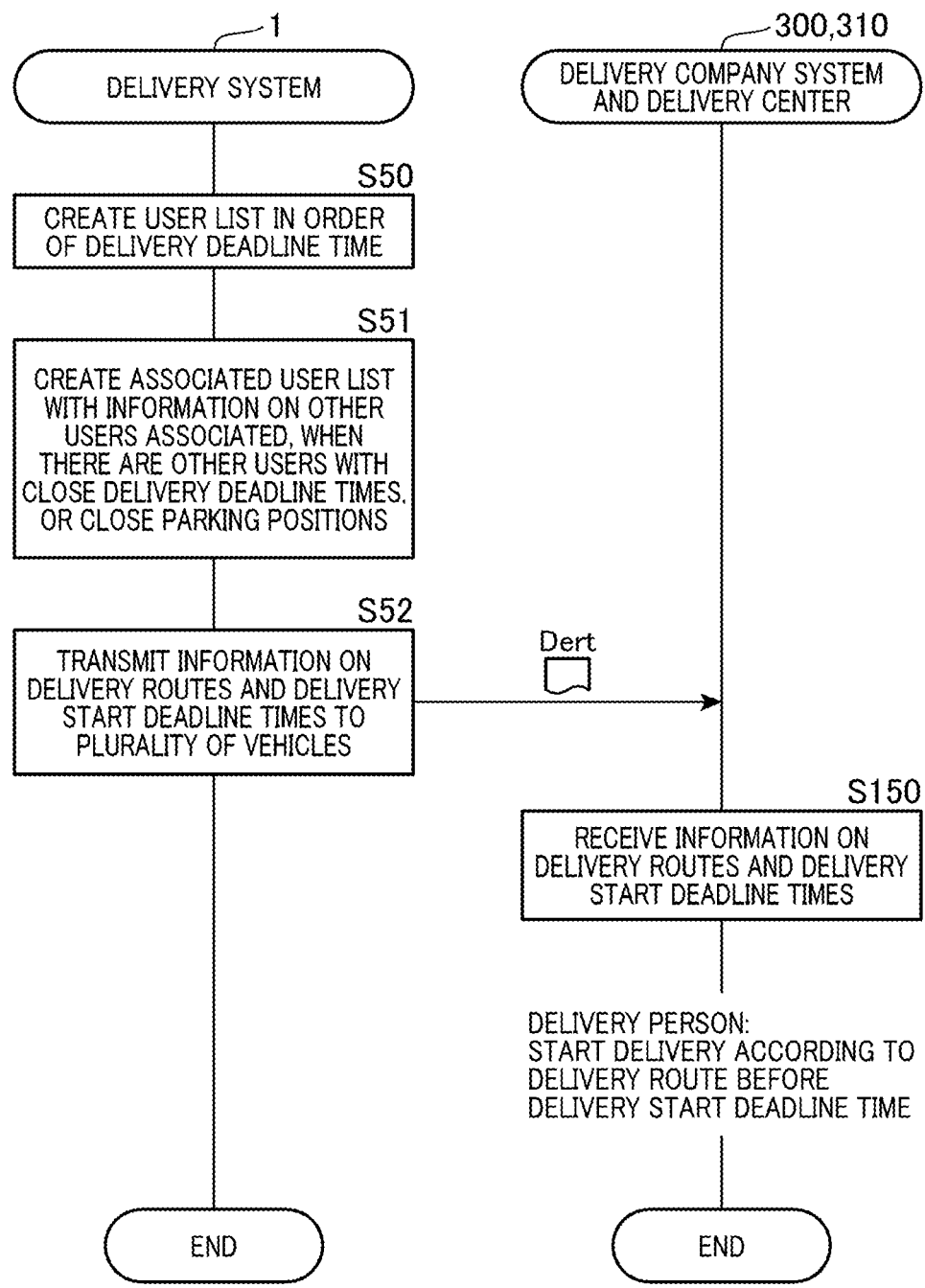
FIG. 7 is an explanatory diagram of a setting process of a delivery route.

Next, in accordance with a flowchart illustrated in FIG. 7, a support process for delivery preparation to the delivery center 310 by the delivery system 1 will be described.

In step S50, the delivery condition setting section 18 of the delivery system 1 refers to the user delivery information 33, associates the QR codes 36a of the respective users with the delivery deadline times 36b, and creates the user list 36 in order of delivery deadlines arranged in order of earlier delivery deadline time (for example, set at the scheduled time of departure—ten minutes). The delivery center 310 can acquire the user list 36 in order of delivery deadlines from the delivery system 1 and confirm the user list 36, as necessary. In the delivery center 310, the delivery person refers to the user list 36 in order of delivery deadlines, and can prepare for delivery from the article requested to be delivered from a user with a shorter remaining time until the delivery deadline time.

Figure 16:
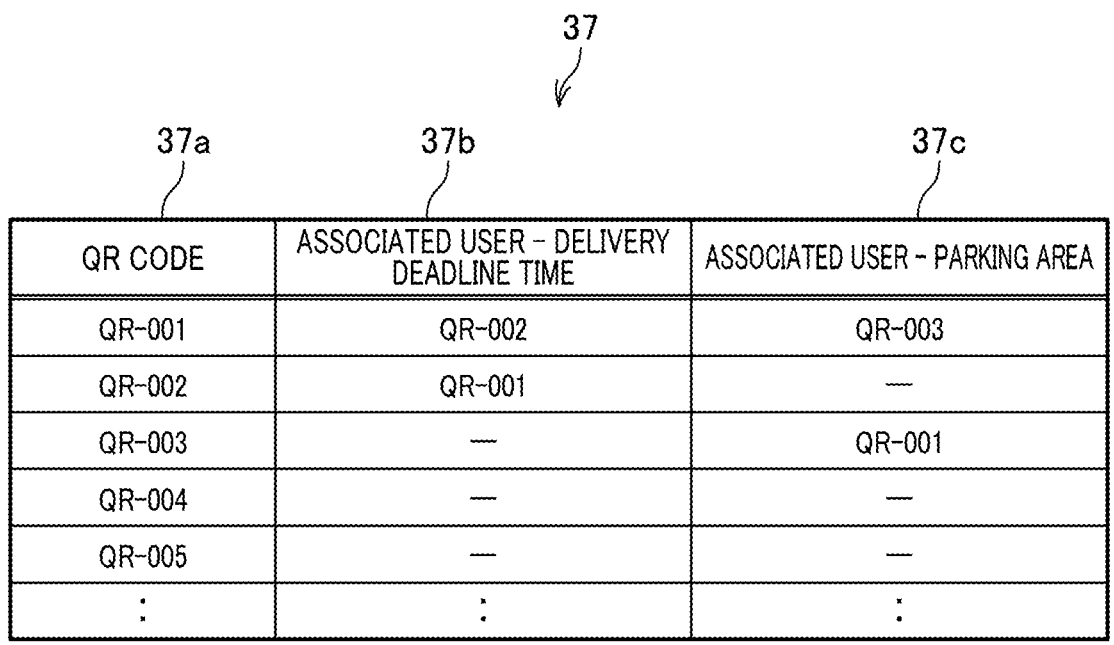
FIG. 16 is an explanatory diagram of a list of associated users having scheduled time of delivery and parking position in common.

In step S51, the delivery condition setting section 18 refers to the user delivery information 33, and creates an associated user list 37 in which the QR codes 37b of the users with the delivery deadline times being close to one another, and the QR codes 37c of other users with the parking areas being close to one another are associated, with respect to the respective users, as illustrated in FIG. 16.

The delivery center 310 can acquire the associated user list 37 from the delivery system 1 and confirm the associated user list 37 when necessary. In the delivery center 310, the delivery person can perform work of collecting purchased articles of a plurality of users by delivery deadline time and parking area by referring to the associated user list 37.

In step S52, the delivery condition setting section 18 refers to the user delivery information 33, the user list 36 in order of the delivery deadlines, and the associated user list 37, and sets a delivery route for efficiently performing delivery to a plurality of parked vehicles. For example, to the user delivery information 33 illustrated in FIG. 13, the delivery route RTd is set as illustrated in FIG. 11.

Figure 11:
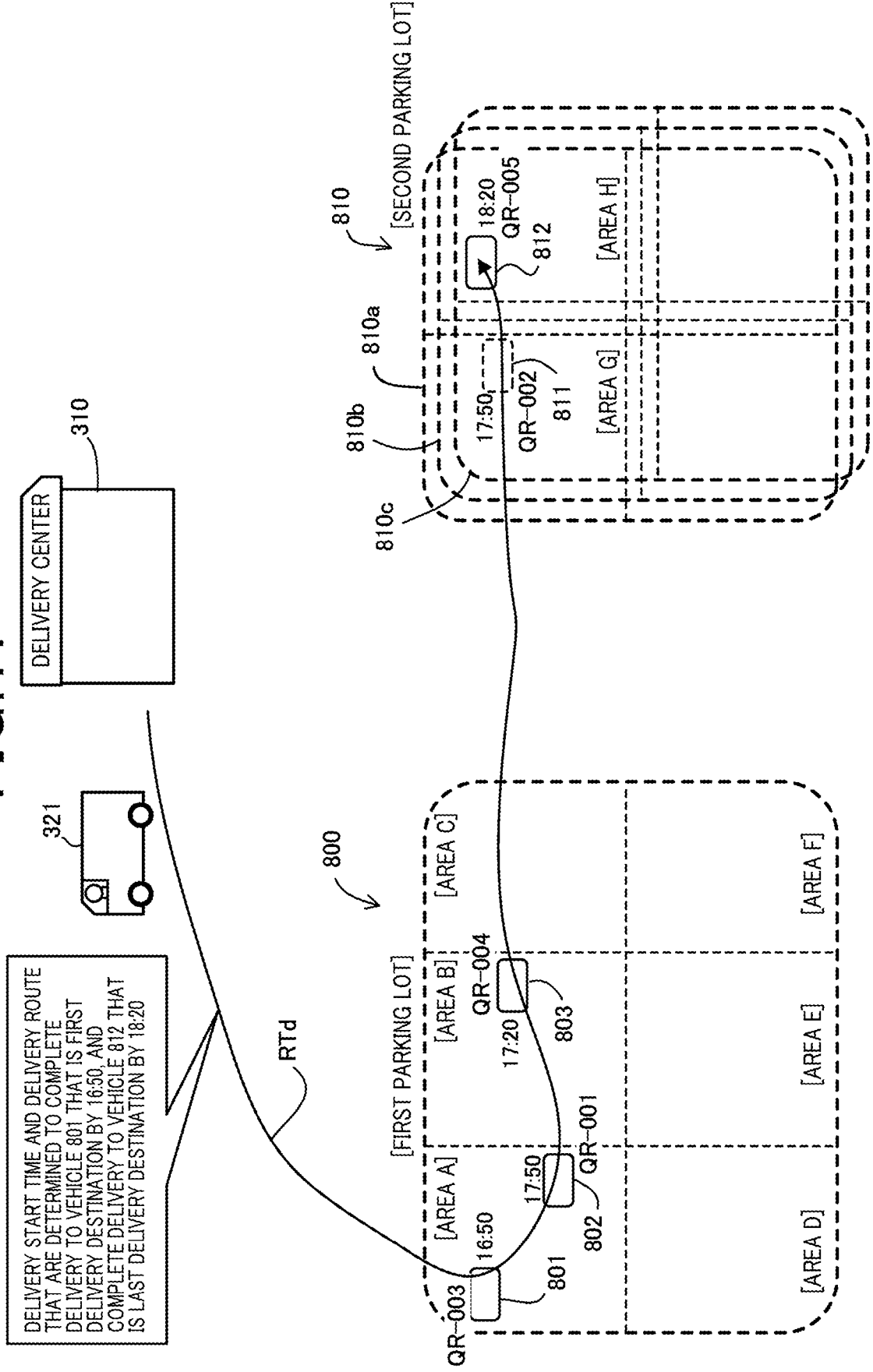
FIG. 11 is an explanatory view of a setting example of the delivery route.

The delivery route RTd illustrated in FIG. 11 is a route for performing delivery in order of the delivery center 310 to Area-A (vehicles 801 and 802) of a first parking lot 800 to Area-B (vehicle 803) of the first parking lot 800 to Area-G (vehicle 811) on a second floor 810b of a second parking lot 810 to Area-H (vehicle 812) on a third floor 810c of the second parking lot 810.

The Area-A of the first parking lot 800 is an area where the vehicle 801 for which the delivery deadline time is set at 16:50 which is earliest is parked. Further, the delivery condition setting section 18 sets a delivery start deadline time by the delivery route RTd so that delivery to the vehicle 801 which is a first delivery destination is completed by 16:50, and delivery to the vehicle 812 which is a last delivery destination is completed by 18:20.

The delivery condition setting section 18 transmits information Dert on the delivery route RTd and the delivery start deadline times to the delivery center 310. The delivery center 310 receives the information Dert on the delivery route RTd and the delivery start deadline times in step S150. In the delivery center 310, the delivery person starts delivery following the delivery route RTd before the delivery start deadline time.

3-4. Accommodation Process of Article into Vehicle

Next, in accordance with the flowchart illustrated in FIG. 8, a process that is executed by the delivery system 1, the delivery person terminal 330 and the vehicle 100 when the delivery person Pd accommodates the article 212 in the vehicle 100 will be described.

In step S200, the delivery person terminal 330 transmits a door unlocking request Dorq of the vehicle 100 including the QR code of the user Pt to the delivery system 1 in accordance with the operation of the delivery person Pd. The user information managing section 11 of the delivery system 1 receives the door unlocking request Dorq in step S60. In subsequent step S61, the user information managing section 11 transmits article delivery information Gdi including the virtual key associated with the QR code, the storage condition of the article 212, the accommodation method of the article 212 and the like to the delivery person terminal 330 by referring to the user delivery information 33.

Here, the delivery request transmitting section 19 transmits the information of the virtual key that restricts an unlockable door to the delivery person terminal 330, in accordance with the accommodation area (designated area of the vehicle room including the passenger room PR and the carriage room CR) of the respective articles designated according to the accommodation method 33i recorded in the user delivery information 33. For example, when the carriage room CR is designated as a specific area for accommodating the article, the delivery request transmitting section 19 transmits the information of the virtual key capable of unlocking only the carriage room door 110 to the delivery person terminal. Further, when a right side of the rear seat 115 is designated as the specific area for accommodating the article, the delivery request transmitting section 19 transmits the information on the virtual key capable of unlocking only the rear right door 106a to the delivery person terminal. As the specific area of the vehicle room, spots capable of accommodating the article, of the carriage room CR, a right side, a center and a left side of the rear seat 115, a seat next to the driver and the like are set. Note that the information on the virtual key, which restricts the unlockable door, may be transmitted to the delivery person terminal 330 from the delivery system 1 via the delivery company system 300.

The delivery person terminal 330 receives the article delivery information Gdi in step S201, and transmits an unlocking instruction VKopen by the virtual key to the vehicle 10 in subsequent step S202. The door locking and unlocking acceptance section 163 of the vehicle 100 refers to the virtual key information 183, and authenticates that the virtual key shown by the unlocking instruction VKopen is registered in the virtual key information 183. The door locking and unlocking control section 164 performs an unlocking process of the door designated by the virtual key.

In subsequent step S82, the door locking and unlocking information transmitting section 166 transmits a door unlocking notice Mopen indicating that the door of the vehicle 100 is unlocked to the delivery system 1. The door locking and unlocking information transmitting section 166 of the delivery system 1 receives the door unlocking notice Mopen in step S62, and transmits an electronic mail Eopen notifying that the door of the vehicle 100 is unlocked to the user terminal 90 in subsequent step S63. The user Pt can know that the door of the vehicle 100 is unlocked and accommodation of the purchased article 212 is started by confirming the electronic mail Eopen by the user terminal 90.

Here, when the door of the vehicle 100 is unlocked by the virtual key which is transmitted from the delivery person terminal 330, the unlocking operator identifying section 165 recognizes that the door is unlocked by the guest (the delivery person Pd in this case). Therefore, in the vehicle 100, in step S83, the indoor light control section 171 forcefully turns on the passenger room light 118 and the carriage room light 120 without depending on the lighting operation. Thereby, the accommodation work of the article 212 into the vehicle 100 in the nighttime by the delivery person Pd can be facilitated.

In step S203, the delivery person terminal 330 transmits the storage condition information Cnd indicating the storage condition of the article 212 to the vehicle 100. The article storage condition acquiring section 168 of the vehicle 100 receives the storage condition information Cnd, and acquires the storage conditions (the storage temperature, avoidance of direct sunlight and the like) of the article 212, in step S84. Further, the delivery person terminal 330 indicates the accommodation method of the article 212 on the display in step S204. As the accommodation method, guidance of necessary seat arrangement, article accommodation spots (the carriage room, the rear seat and the like), setting of the sunshades and the like is displayed as described above. The delivery person Pd confirms the display on the delivery person terminal 330, and accommodates the article in the vehicle 100. The configuration in which the accommodation method is reported to the delivery person terminal 330 in this way corresponds to an accommodation method reporting section of the present invention.

The indoor environment control section 170 of the vehicle 100 operates the air-conditioning device 125 and the sunshades 103a, 103b, 107a and 107b in accordance with the accommodation condition of the article 212 which is acquired by the article storage condition acquiring section 168. For example, when accommodation into the rear seat is set as the accommodation method, only the sunshades 107a and 107b in the rear seat may be operated.

The delivery person Pd who completes accommodation of the article into the vehicle performs a locking operation of the door of the vehicle 100 by the delivery person terminal 330. In response to the locking operation, the delivery person terminal 330 transmits a locking instruction VKclose by the virtual key to the vehicle 100 in step S205.

The door locking and unlocking acceptance section 163 receives the locking instruction VKclose in step S87, determines whether the virtual key included in the locking instruction VKclose is registered in the virtual key information 183, and performs authentication of the virtual key. In subsequent step S87, the door locking and unlocking control section 164 operates the door lock mechanisms 104a, 104b, 108a, 108b and 111, and locks the doors 102a, 102b, 106a, 106b and 110.

In next step S88, the door locking and unlocking information transmitting section 166 confirms that the doors 102a, 102b, 106a, 106b and 110 are locked by the door lock sensors 105a, 105b, 109a, 109b and 112. Subsequently, the door locking and unlocking information transmitting section 166 transmits a door locking notice Mclose notifying that the door is locked to the delivery system 1. Further in subsequent step S89, the indoor light control section 171 turns off the passenger room light 118 and the carriage room light 120 when a third predetermined time period elapses from a time at which the door is locked in step S87.

The door locking and unlocking recognizing section 20 of the delivery system 1 receives the door locking notice Mclose in step S64, and recognizes that the door of the vehicle 100 is locked. In subsequent step S65, the door locking and unlocking notifying section 21 transmits an electronic mail Eclose notifying that delivery of the purchased article 212 into the vehicle 100 is completed and the door is locked to the user terminal 90 based on a recognition result of the door locking and unlocking recognizing section 20. The user Pt can know that the purchased article 212 is delivered into the vehicle 100 and the door is locked, by confirming the electronic mail Eclose by the user terminal 90.

4. Other Embodiments

Figure 8:
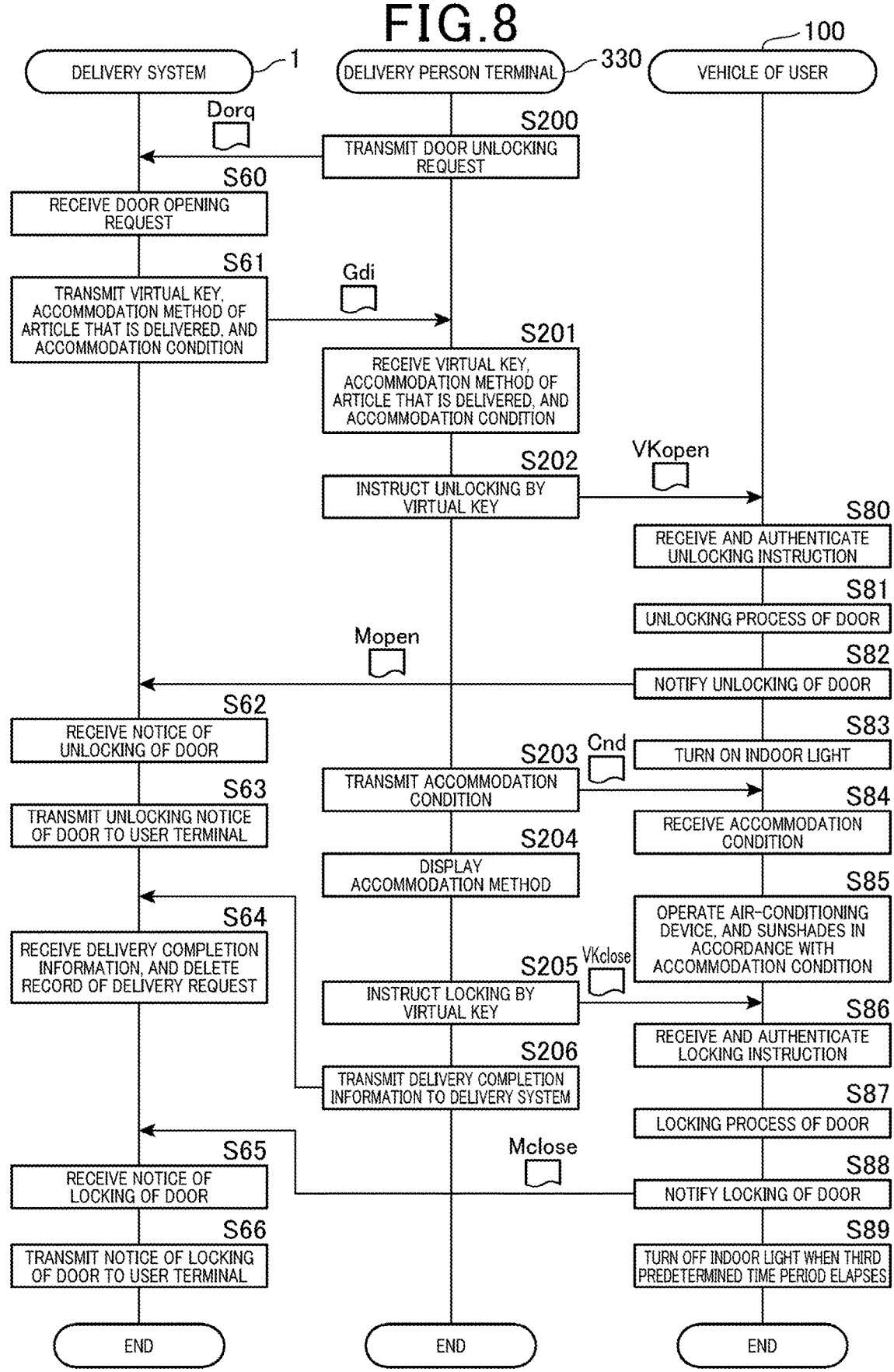
FIG. 8 is an explanatory diagram of a process accompanying accommodation of an article to a vehicle.

In the above described embodiment, in steps S205, S86 and S87 in FIG. 8, the door locking and unlocking control section 164 of the vehicle 100 locks the door in response to the operation of the delivery person terminal 330 by the delivery person Pd. As another configuration, a configuration may be adopted, in which when at least any one of the following condition 1 to condition 4 is established, the door locking and unlocking control section 164 locks the door of the vehicle 100.

Condition 1 . . . When a first predetermined time period elapses from the time point at which the door is unlocked in step S81.

Condition 2 . . . When the delivery person Pd moves away from the vehicle 100 by a predetermined distance or more. It can be determined that the delivery person Pd moves away from the vehicle 100 by the predetermined distance or more by detecting that a state where the delivery person Pd is captured by any of the external cameras 101a to 101d changes to a state where the delivery person is not captured by any of the external cameras 101a to 101d, for example.

Condition 3 . . . When short-range communication between the vehicle 100 and the delivery person terminal 330 by BR/EDR, BLE, NFC, Wi-Fi or the like becomes impossible.

In the above described embodiment, the case where when the user Pt of the vehicle 100 purchases the article 212, the user Pt requests to deliver the article 212 to the vehicle 100 is illustrated, but a configuration may be adopted, in which delivery of articles other than purchased article to the vehicle 100 by the user Pt is accepted. As the articles other than the purchased article, a stroller carried in the theme park 200 by the user Pt, a coat which is carried by the user Pt for protection against the cold but is determined as unnecessary to wear, novelty goods distributed in the theme park 200 and the like are applicable. A process in the case of accepting the request to deliver the articles other than the purchased article is similar to the process to the purchased article except that the settlement process is performed.

In the above described embodiment, the store terminal 211 and the delivery system 1 are configured as separate systems, but all of these may be configured as one delivery system. In this case, the delivery request accepting section of the present invention is configured by including the store terminal 211. Further, a configuration may be adopted, in which the functions of the delivery company system 300 and the delivery center 310 are combined into the delivery person terminal 330, and the delivery request information Dc2 is transmitted to the delivery person terminal 330 from the delivery system 1. In this case, the delivery person terminal 330 corresponds to the delivery company system of the present invention.

In the above described embodiment, as illustrated in FIG. 12, the configuration is adopted, in which the user identification information (QR code) and the credit information of the user are associated with each other and recorded in the user registration information 32. According to the configuration, the delivery request and settlement process are performed by one procedure by providing the user identification information, but this configuration does not have to be included.

In the above described embodiment, the virtual key use restricting section 22 is included, and unlocking of the door of the vehicle by the virtual key is made impossible after delivery is completed, but the virtual key use restricting section 22 does not have to be included.

In the above described embodiment, the indoor environment control section 170 controls the indoor environment of the vehicle 100 by operating the air-conditioning device 125 and the sunshades 103a, 103b, 107a and 107b, but the indoor environment may be controlled by operating only the air-conditioning device 125, or only the sunshades 103a, 103b, 107a and 107b. Further, when a seat heater is included as the on-vehicle device of the vehicle 100, the indoor temperature may be raised by operating the seat heater.

Note that FIG. 2 and FIG. 4 are schematic diagrams illustrating the function configurations of the delivery system 1 and the vehicle 100 by dividing the function configurations according to main process contents to facilitate understanding of the invention of the present application, and the configurations of the delivery system 1 and the vehicle 100 may be configured by other divisions. Further, the processes of the respective components may be executed by one hardware unit, or may be executed by a plurality of hardware units. Further, the process of the respective components may be executed by one program, or may be executed by a plurality of programs.

REFERENCE SIGNS LIST

1 . . . Delivery system, 10 . . . CPU (of delivery system), 11 . . . User information managing section, 12 . . . Vehicle position recognizing section, 13 . . . Delivery request accepting section, 14 . . . Article accommodation determining section, 15 . . . Accommodation impossible notifying section, 16 . . . Vehicle use scheduled time recognizing section, 17 . . . Delivery acceptance end time setting section, 18 . . . Delivery condition setting section, 19 . . . Delivery request transmitting section, 20 . . . Door locking and unlocking recognizing section, 21 . . . Door locking and unlocking notifying section, 22 . . . Virtual key use restricting section, 30 . . . Memory (of delivery system), 31 . . . Control program, 32 . . . User registration information, 33 . . . User delivery information, 34 . . . Vehicle specification information, 35 . . . Beacon position information, 40 . . . Communication section, 90 . . . User terminal, 91 . . . QR code, 100 . . . Vehicle of user, 126 . . . Navigation device, 127 . . . Communication unit, 150 . . . Vehicle control device, 160 . . . CPU (of vehicle control device), 161 . . . Position detecting section, 162 . . . Positional information transmitting section, 163 . . . Door locking and unlocking acceptance section, 164 . . . Door locking and unlocking control section, 165 . . . Unlocking operator identifying section, 166 . . . Door locking and unlocking information transmitting section, 167 . . . Vehicle room information transmitting section, 168 . . . Article storage condition acquiring section 168, 170 . . . Indoor environment control section, 171 . . . Indoor light control section, 172 . . . Battery control section, 180 . . . Memory (of vehicle control device), 181 . . . Control program, 182 . . . Vehicle ID information, 183 . . . Virtual key information, 184 . . . Beacon position information, 200 . . . Theme park, 210 . . . Store, 211 . . . Store terminal, 212 . . . Article sold in store, 600 . . . Multistory parking garage, 611 to 613, 621 to 623, 631 to 633 . . . Beacon

What is claimed is:
1. A vehicle control device comprising a central processing unit, wherein the central processing unit comprises:
an article storage condition acquiring section that acquires a storage condition of an article that is accommodated in a room of a vehicle; and an indoor environment control section that controls an indoor environment of the vehicle by operating an on-vehicle device of the vehicle, based on the storage condition acquired in the article storage condition acquiring section, wherein the article storage condition acquiring section acquires a storage condition of the article with delivery to the vehicle being scheduled, the indoor environment control section operates the on-vehicle device of the vehicle based on the storage condition, when the article is accommodated in the vehicle by the delivery, the on-vehicle device includes a sunshade that is provided at a window or door of the vehicle and is for shielding sunlight into the room of the vehicle, and the central processing unit further comprises an accommodation method reporting section that reports accommodation of the article to a spot where sunlight into the room of the vehicle is shielded, or setting of the sunshade for shielding sunlight into the room of the vehicle to a terminal device of a delivery person who performs the delivery, when avoidance of sunlight is included in the storage condition acquired in the article storage condition acquiring section.

2. The vehicle control device according to claim 1, wherein the on-vehicle device includes an air-conditioning device that controls air-conditioning in the room of the vehicle, and when a storage temperature of the article is included in the storage condition acquired in the article storage condition acquiring section, the indoor environment control section operates the air-conditioning device based on the storage temperature.

3. The vehicle control device according to claim 1, wherein when the storage condition acquired in the article storage condition acquiring section includes avoidance of sunlight, the indoor environment control section operates the sunshade.

4. The vehicle control device according to claim 1, wherein the central processing unit further comprises:

a remaining energy amount detecting section that detects a remaining energy amount of a power source that supplies electric power to the on-vehicle device, wherein the indoor environment control section does not operate the on-vehicle device when the remaining energy amount detected by the remaining energy amount detecting section is a predetermined lower limit amount or less.

5. The vehicle control device according to claim 4, wherein the central processing unit further comprises:

an energy supply detecting section that detects that energy is supplied to the power source from an energy replenishment device, wherein the indoor environment control section operates the on-vehicle device even when the remaining energy amount of the power source is the lower limit amount or less, when it is detected that energy is supplied to the power source from the energy replenishment device by the energy supply detecting section.

6. A delivery system that supports delivery of an article to a vehicle including a vehicle control device, wherein the delivery system comprises a central processing unit comprising:

an article storage condition acquiring section that acquires a storage condition of an article that is accommodated in a room of a vehicle, an indoor environment control section that controls an indoor environment of the vehicle by operating an on-vehicle device of the vehicle based on the storage condition acquired in the article storage condition acquiring section, and a remaining energy amount detecting section that detects a remaining energy amount of a power source that supplies electric power to the on-vehicle device, the central processing unit comprising:

a delivery request accepting section that accepts delivery of the article to the vehicle;

a time information acquiring section that acquires a scheduled time of delivery of the article to the vehicle and a scheduled time of start of use of the vehicle; and a storage impossible notifying section that determines whether it is possible or impossible to operate the on-vehicle device based on the storage condition while keeping a state in which a remaining energy amount of the power source detected by the remaining energy amount detecting section is larger than a predetermined lower limit energy amount, in a period from the scheduled time of delivery until the scheduled time of start of use, when a delivery request of the article to the vehicle is accepted by the delivery request accepting section, and notifies an acceptance terminal device that accepts the delivery request, or a terminal device of a delivery requester who makes the delivery request that storage of the article in the vehicle is impossible, when determining that it is impossible.

* * * * *